(12) United States Patent
Prabhakar et al.

(10) Patent No.: US 8,827,691 B2
(45) Date of Patent: Sep. 9, 2014

(54) DISTRIBUTED COMBUSTION PROCESS AND BURNER

(75) Inventors: Rajeev S. Prabhakar, Wilmington, DE (US); Remi Pierre Tsiava, Saint Germain-les-Corbeil (FR); Magnus Mortberg, Frankfurt am Main (DE); Benoit Grand, Versaillies (FR); Bertrand Leroux, Breuillet (FR); Vivek Gautam, Bear, DE (US)

(73) Assignees: L'Air Liquide, Societe Anonyme pour l'Etude et l'Exploitation des Procedes Georges Claude, Paris (FR); American Air Liquide, Inc., Freemont, CA (US)

( * ) Notice: Subject to any disclaimer, the term of this patent is extended or adjusted under 35 U.S.C. 154(b) by 1015 days.

(21) Appl. No.: 12/848,132

(22) Filed: Jul. 31, 2010

(65) Prior Publication Data

US 2012/0009532 A1 Jan. 12, 2012

Related U.S. Application Data

(60) Provisional application No. 61/363,627, filed on Jul. 12, 2010.

(51) Int. Cl.
*F23C 5/00* (2006.01)
*F23D 14/32* (2006.01)
*F23D 14/22* (2006.01)

(52) U.S. Cl.
CPC ....... *F23D 14/32* (2013.01); *F23C 2900/99001* (2013.01); *F23C 2900/07022* (2013.01); *Y02E 20/342* (2013.01); *F23D 14/22* (2013.01); *Y02E 20/344* (2013.01)
USPC ....... 431/8; 431/9; 431/10; 431/181; 431/187

(58) Field of Classification Search
USPC ..................... 431/8, 9, 10, 181, 187
See application file for complete search history.

(56) References Cited

U.S. PATENT DOCUMENTS

| | | | | |
|---|---|---|---|---|
| 5,554,022 A | * | 9/1996 | Nabors et al. | 431/10 |
| 5,570,679 A | | 11/1996 | Wunning | |
| 5,636,977 A | | 6/1997 | Benson et al. | |

(Continued)

FOREIGN PATENT DOCUMENTS

| | | |
|---|---|---|
| EP | 1 850 067 | 10/2007 |
| WO | WO 2004/029511 | 4/2004 |
| WO | WO 2006/031163 | 3/2006 |
| WO | WO 2009/087227 | 7/2009 |

*Primary Examiner* — Kenneth Rinehart
*Assistant Examiner* — Gajanan M Prabhu
(74) *Attorney, Agent, or Firm* — Christopher J. Cronin

(57) ABSTRACT

During a heating phase, injection of a jet of fuel and oxidant (fuel annularly enshrouding oxidant or oxidant annularly enshrouding fuel) from a fuel-oxidant nozzle is combusted in a combustion space. During a transition from the heating phase to a distributed combustion phase, an amount of a secondary portion of either the fuel or oxidant is injected as a jet into the combustion space while the primary portion of that same reactant from the fuel-oxidant nozzle is decreased. At some point during the transition phase, a jet of actuating fluid is injected at an angle towards the jet of reactants from the fuel-oxidant nozzle and/or towards the jet of the secondary portion of reactant. The jet of primary portions of reactants and/or secondary portion of reactant is caused to be bent/deviated towards the other of the two jets. The staging of the secondary portion of reactant is increased until a desired degrees of staging and commencement of a distributed combustion phase are achieved.

19 Claims, 27 Drawing Sheets

(56) References Cited

U.S. PATENT DOCUMENTS

| | | |
|---|---|---|
| 5,772,421 A | 6/1998 | Besik et al. |
| 5,961,312 A | 10/1999 | Sugiyama et al. |
| 6,007,326 A | 12/1999 | Ryan, III et al. |
| 6,394,790 B1 | 5/2002 | Kobayashi |
| 6,663,380 B2 | 12/2003 | Rabovitser et al. |
| 6,773,256 B2 | 8/2004 | Joshi et al. |
| 7,594,811 B2 * | 9/2009 | Lugnet et al. .................. 431/12 |
| 8,057,221 B2 * | 11/2011 | Rangmark et al. ............ 431/181 |
| 8,235,709 B2 * | 8/2012 | Meagher et al. .............. 431/280 |
| 2003/0148236 A1 | 8/2003 | Joshi et al. |
| 2007/0254251 A1 | 11/2007 | Cao et al. |
| 2010/0068666 A1 * | 3/2010 | Zamuner et al. ............. 431/181 |
| 2010/0276507 A1 | 11/2010 | Labegorre et al. |

* cited by examiner

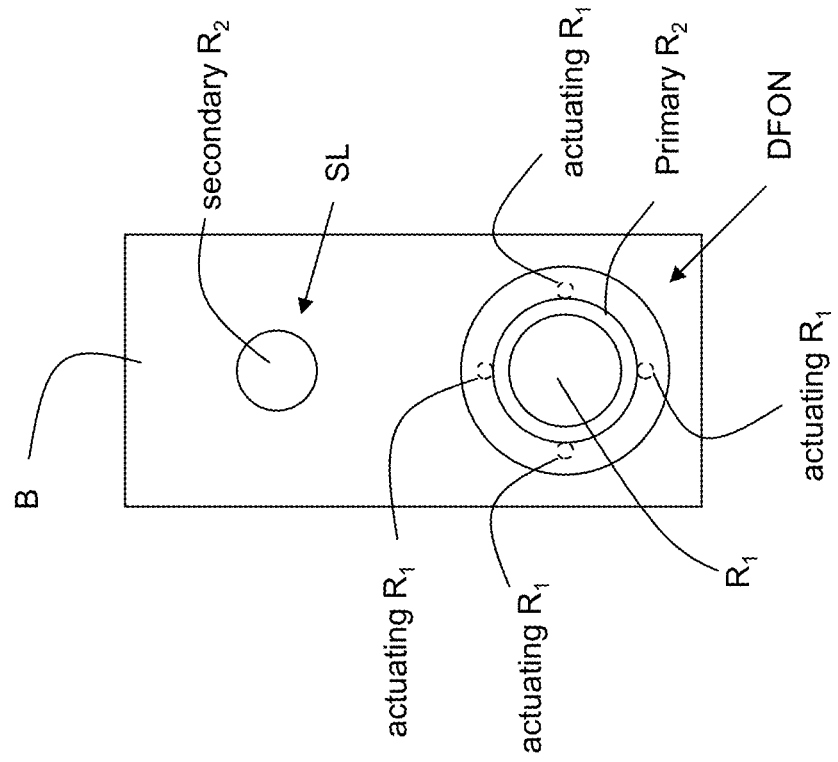
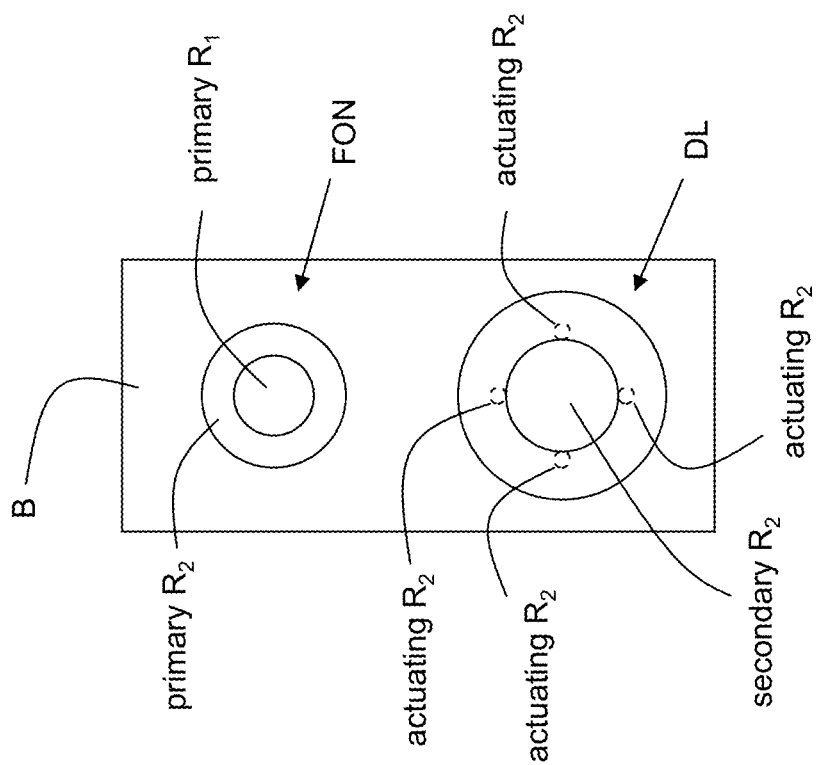

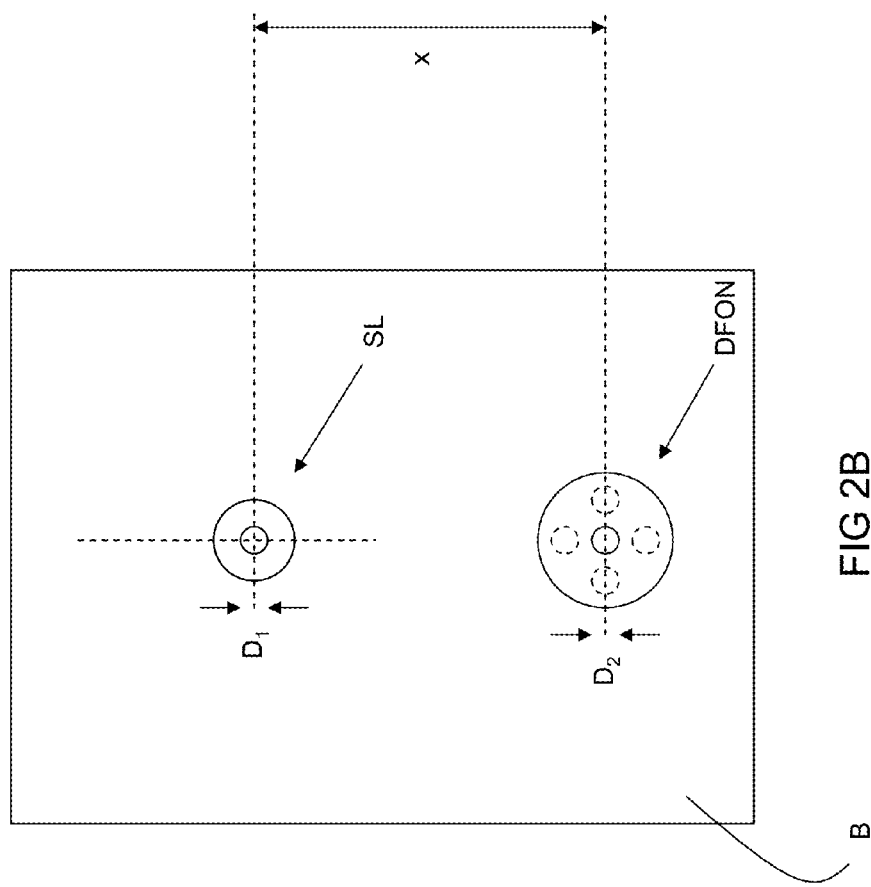

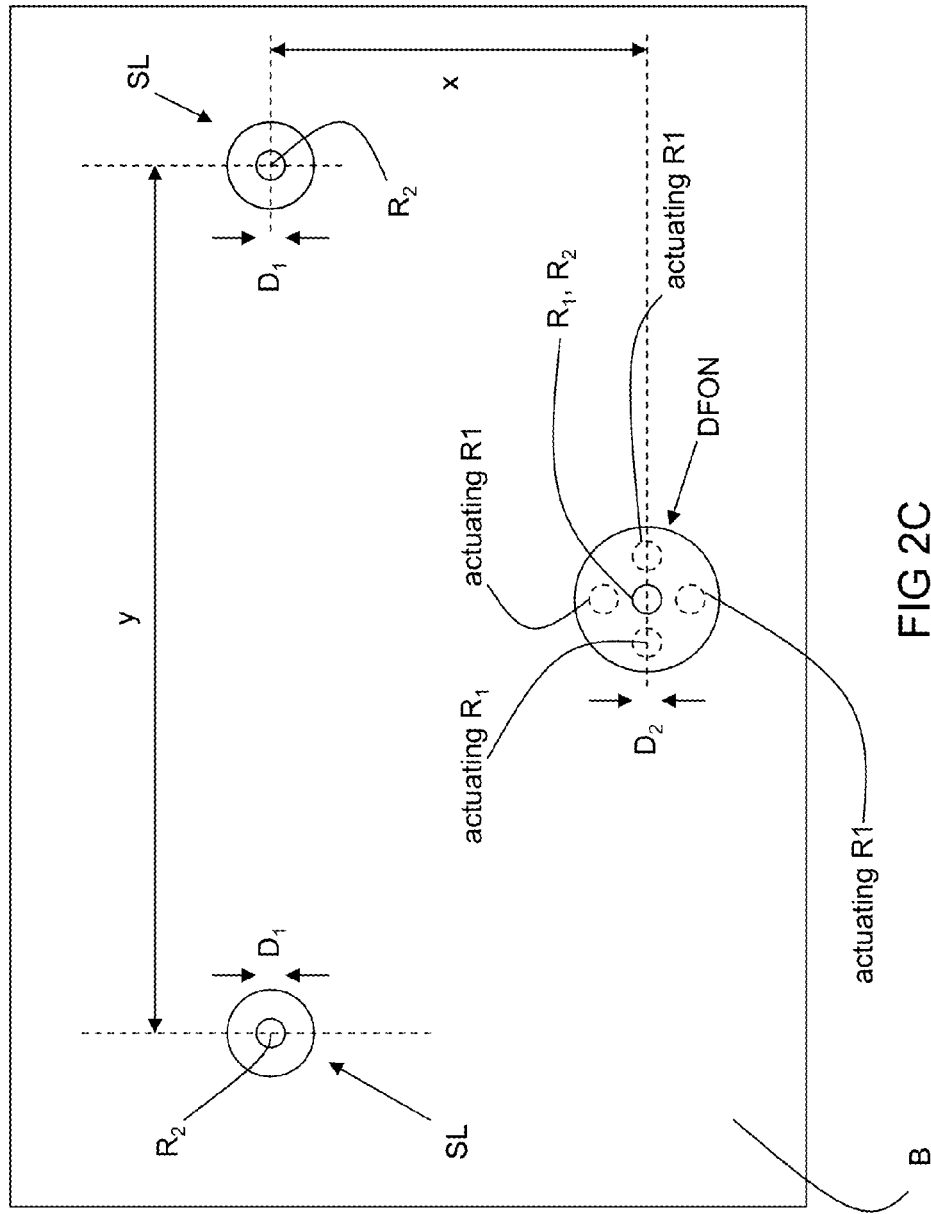

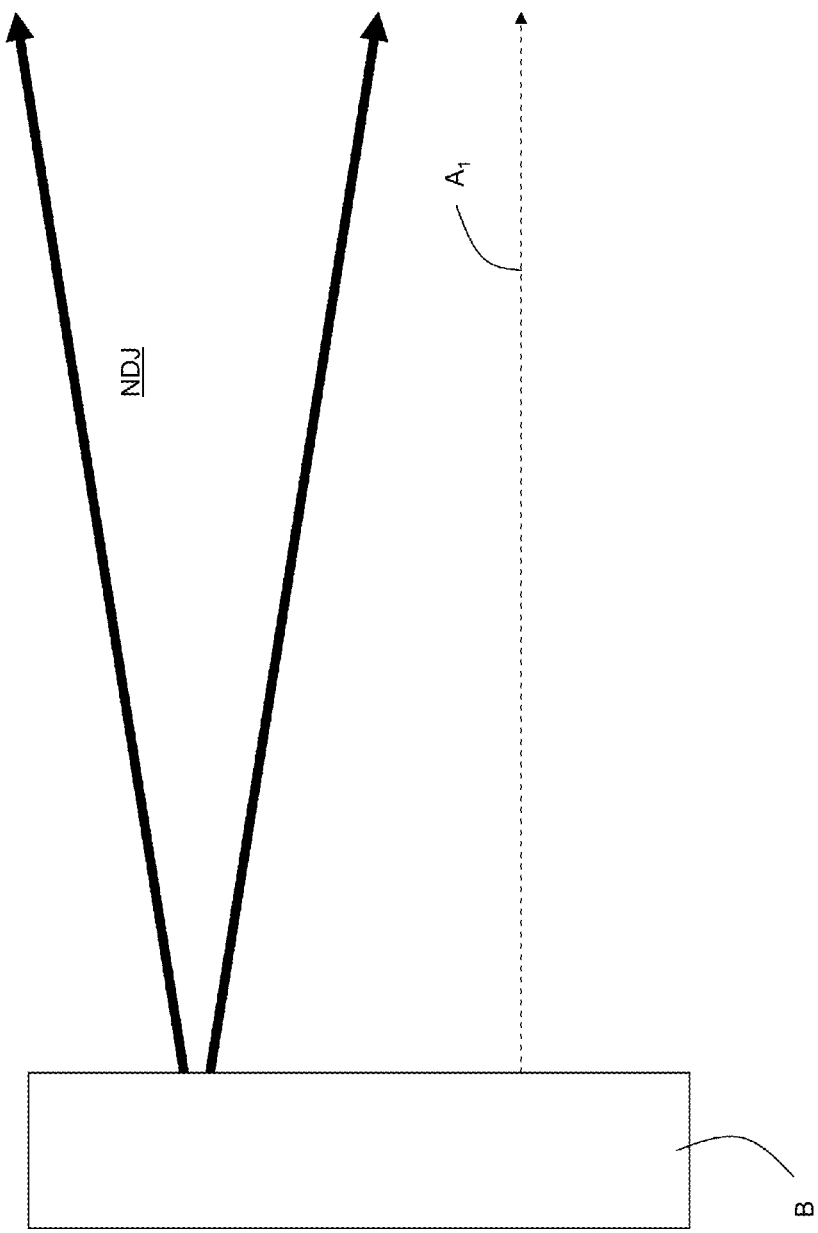

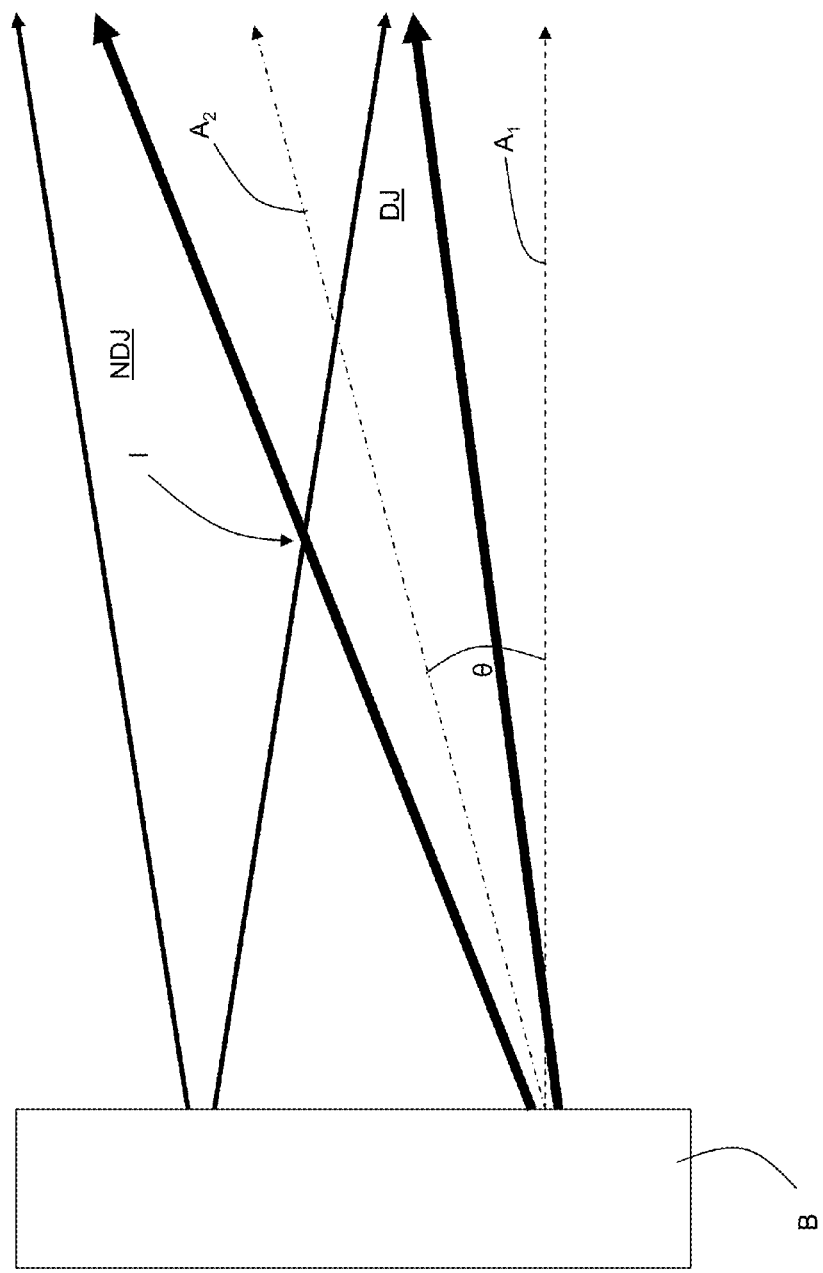

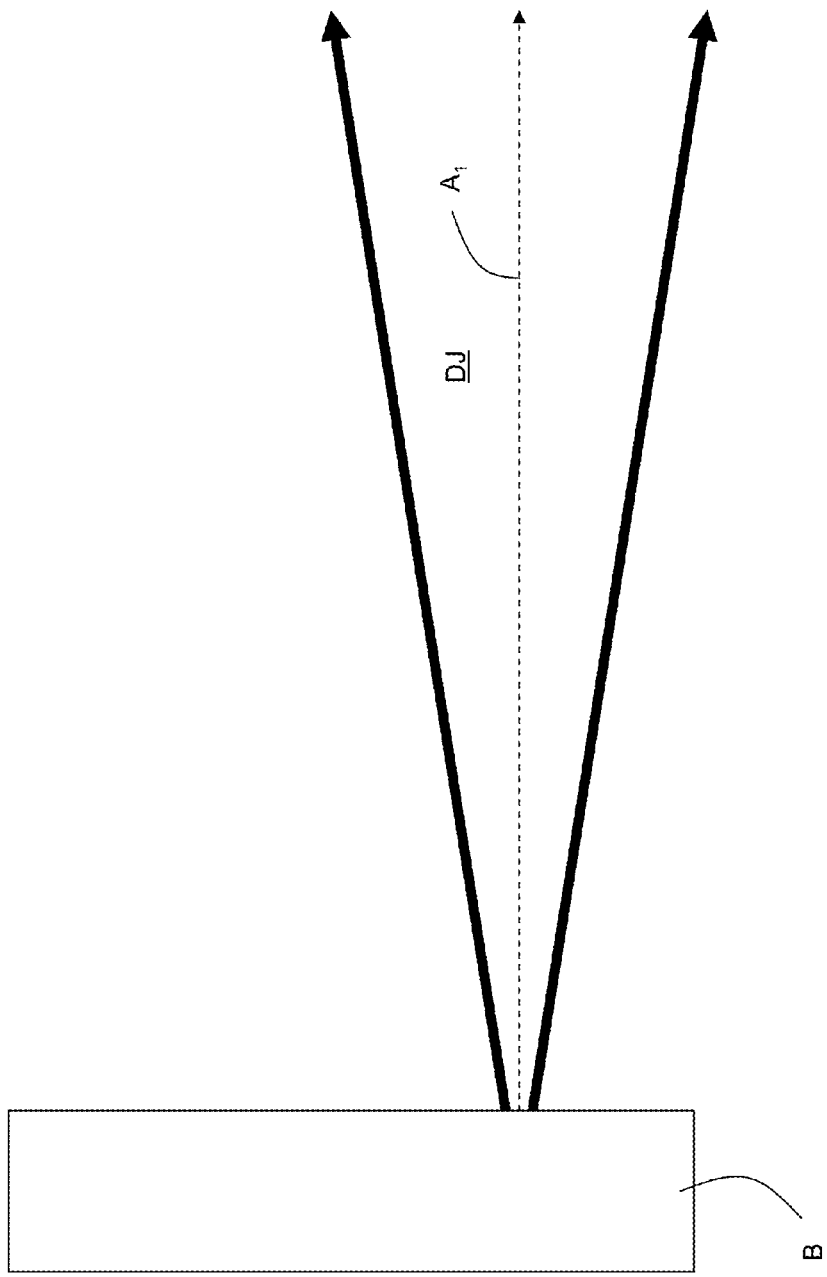

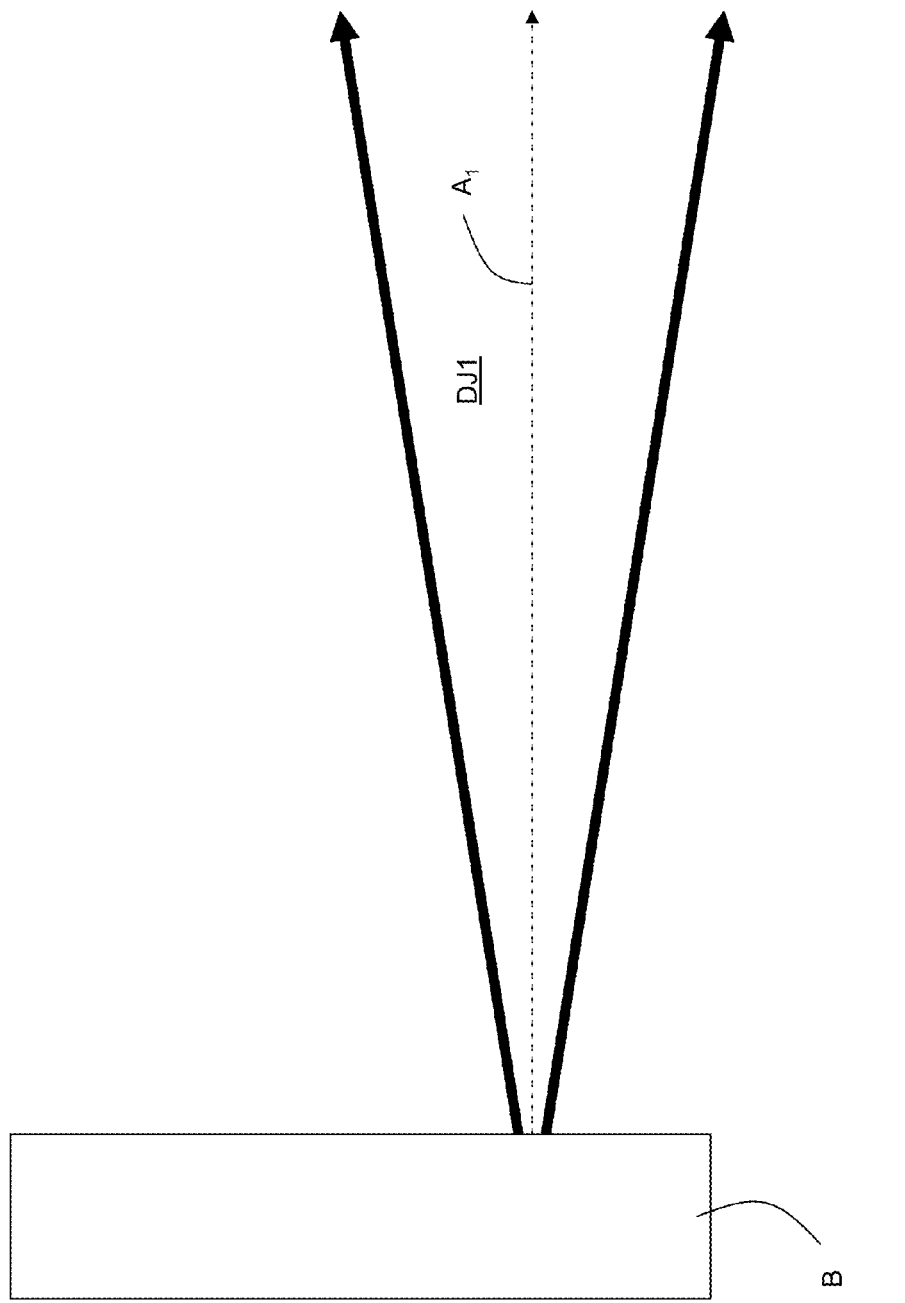

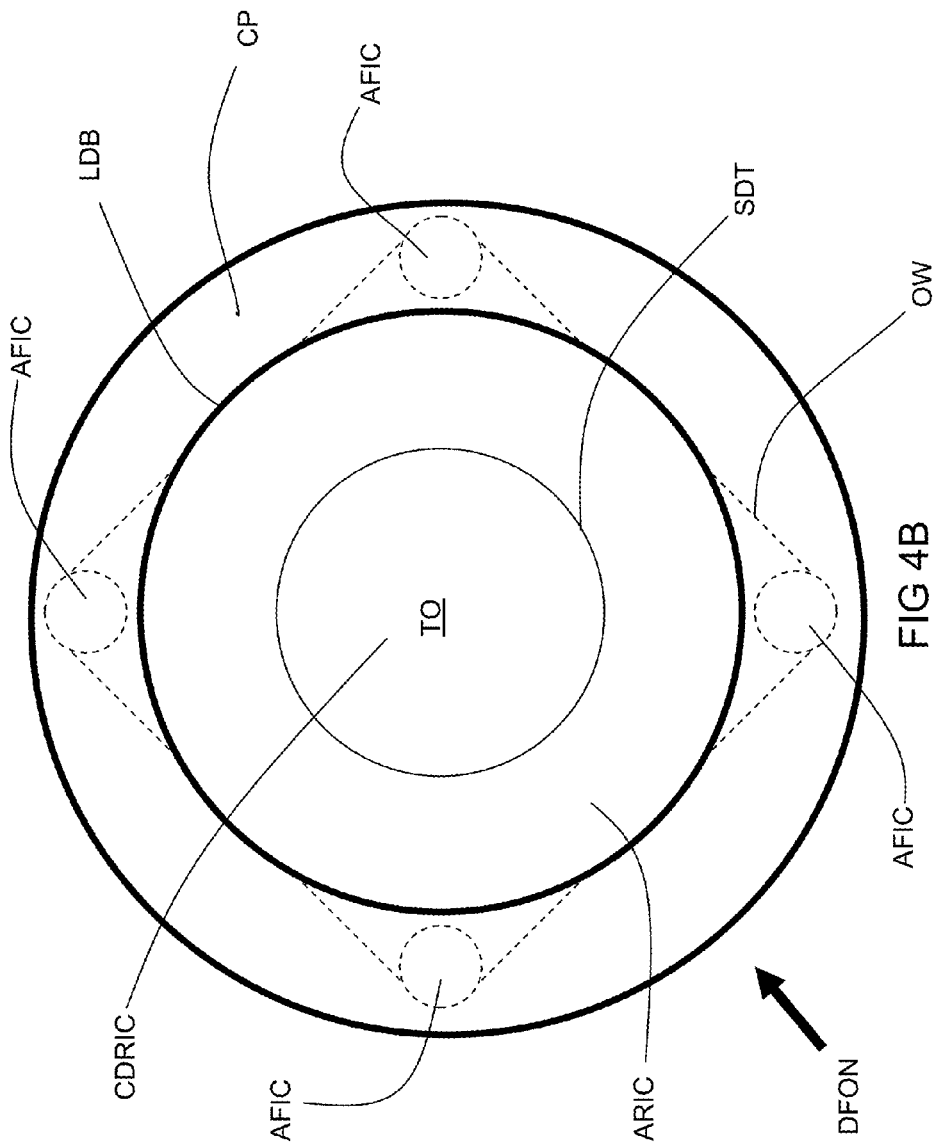

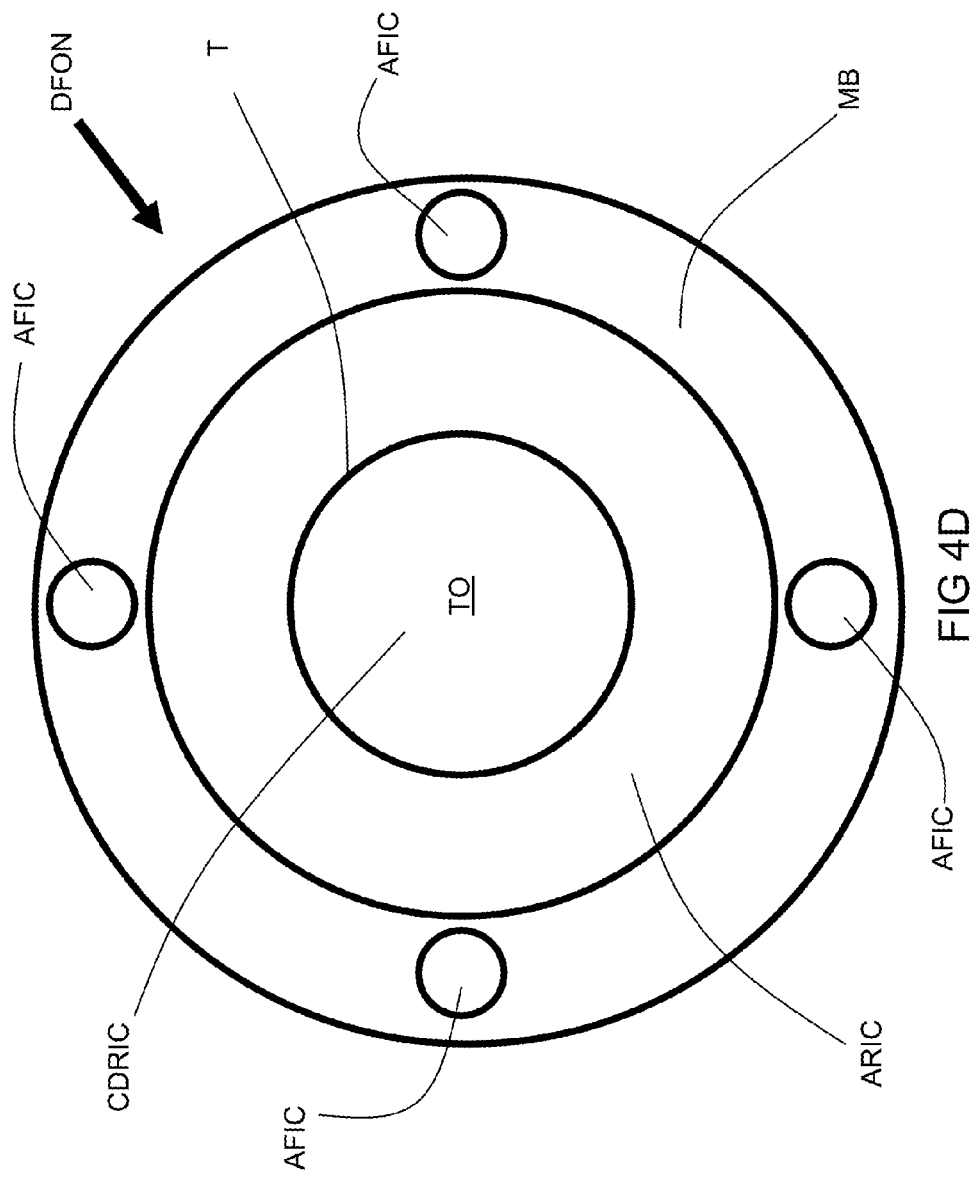

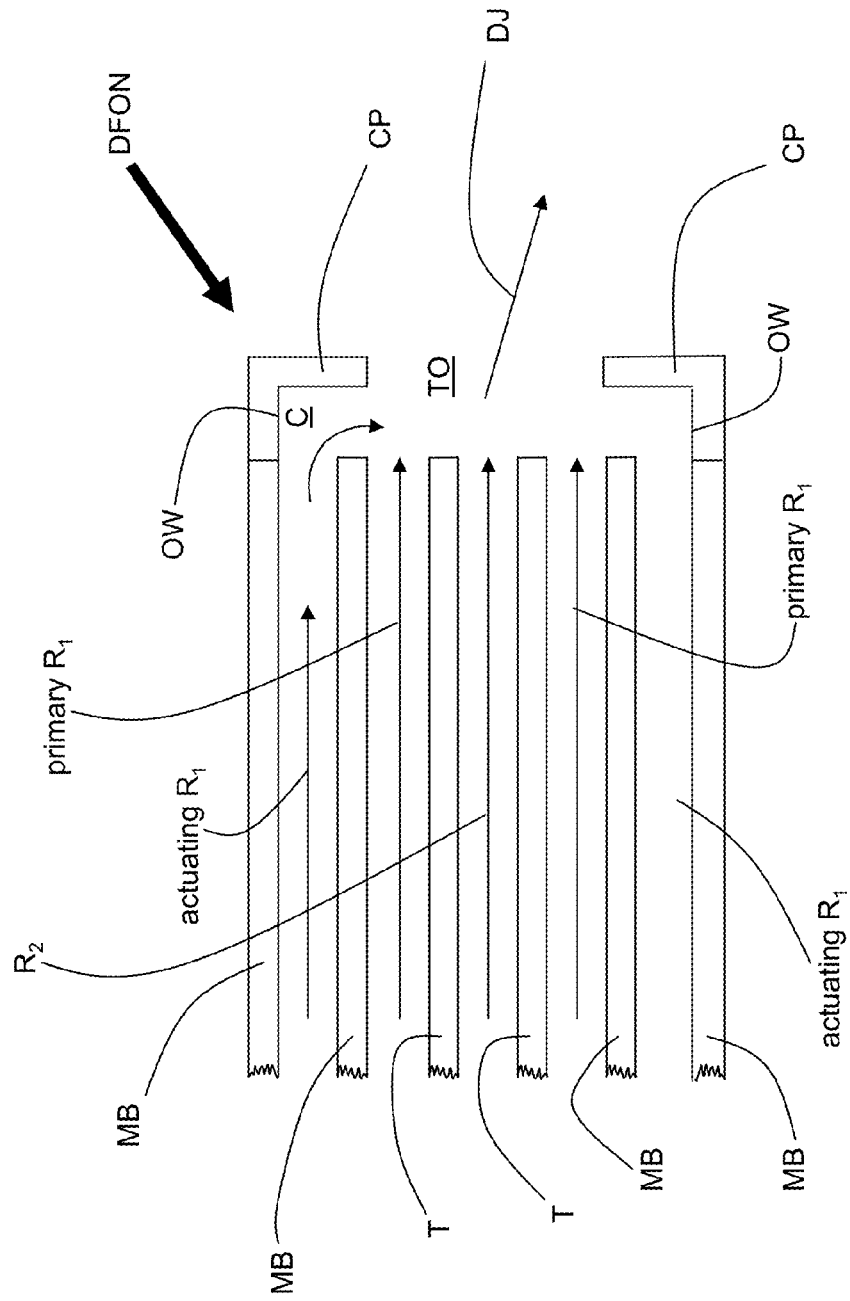

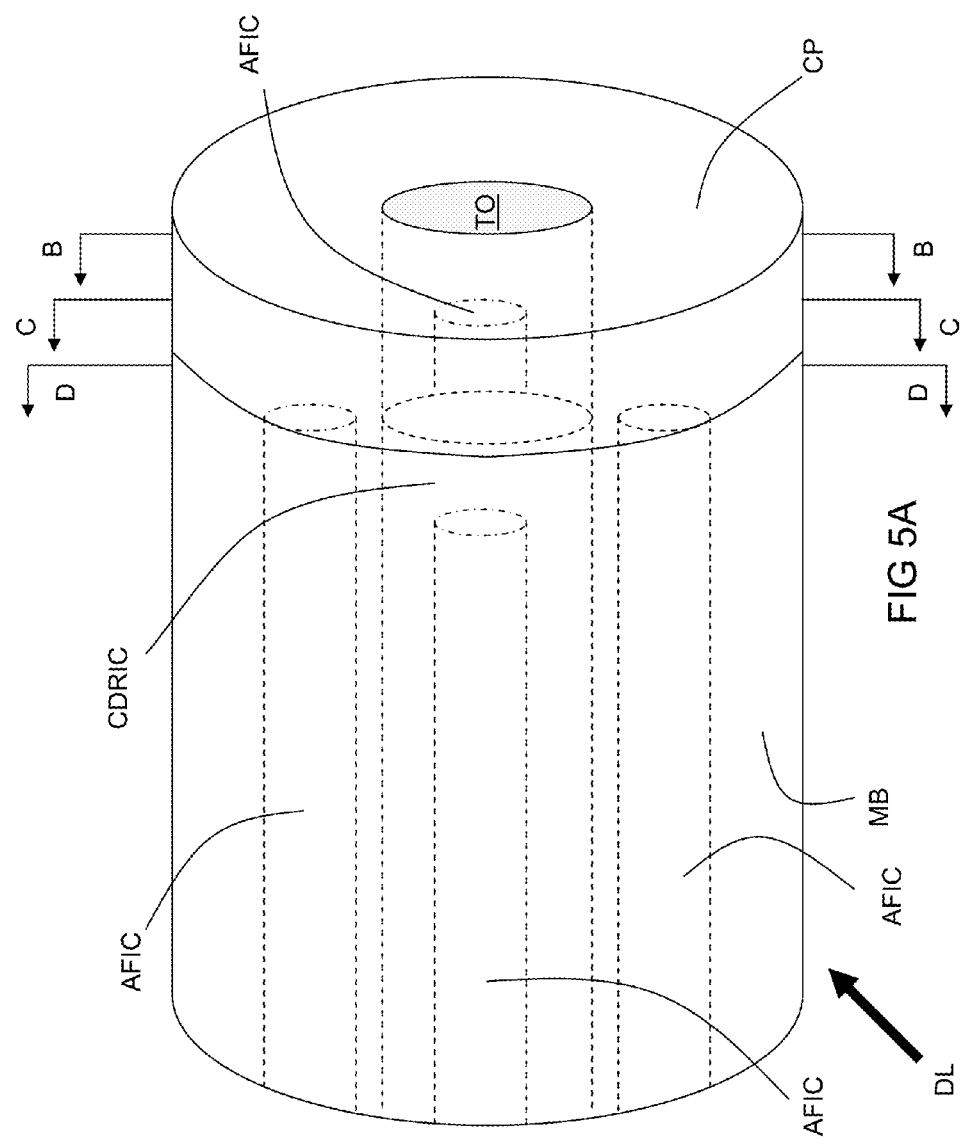

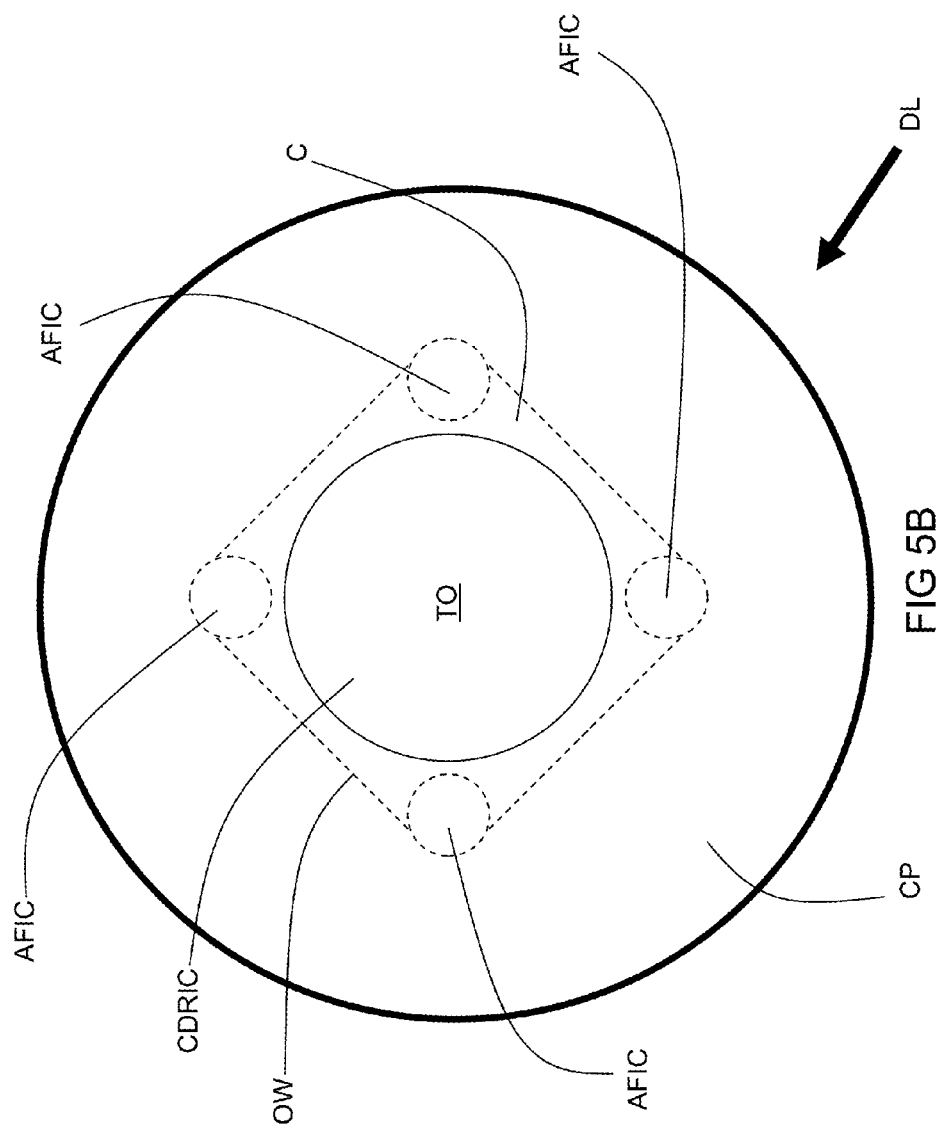

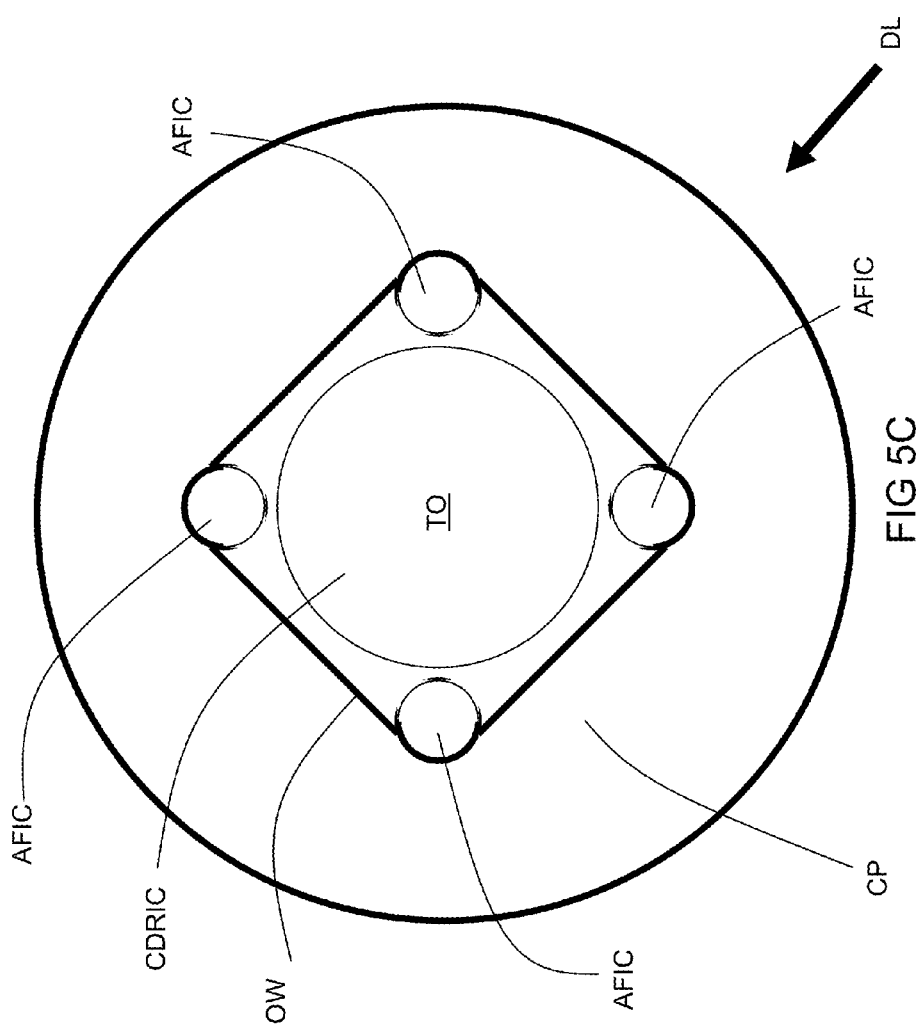

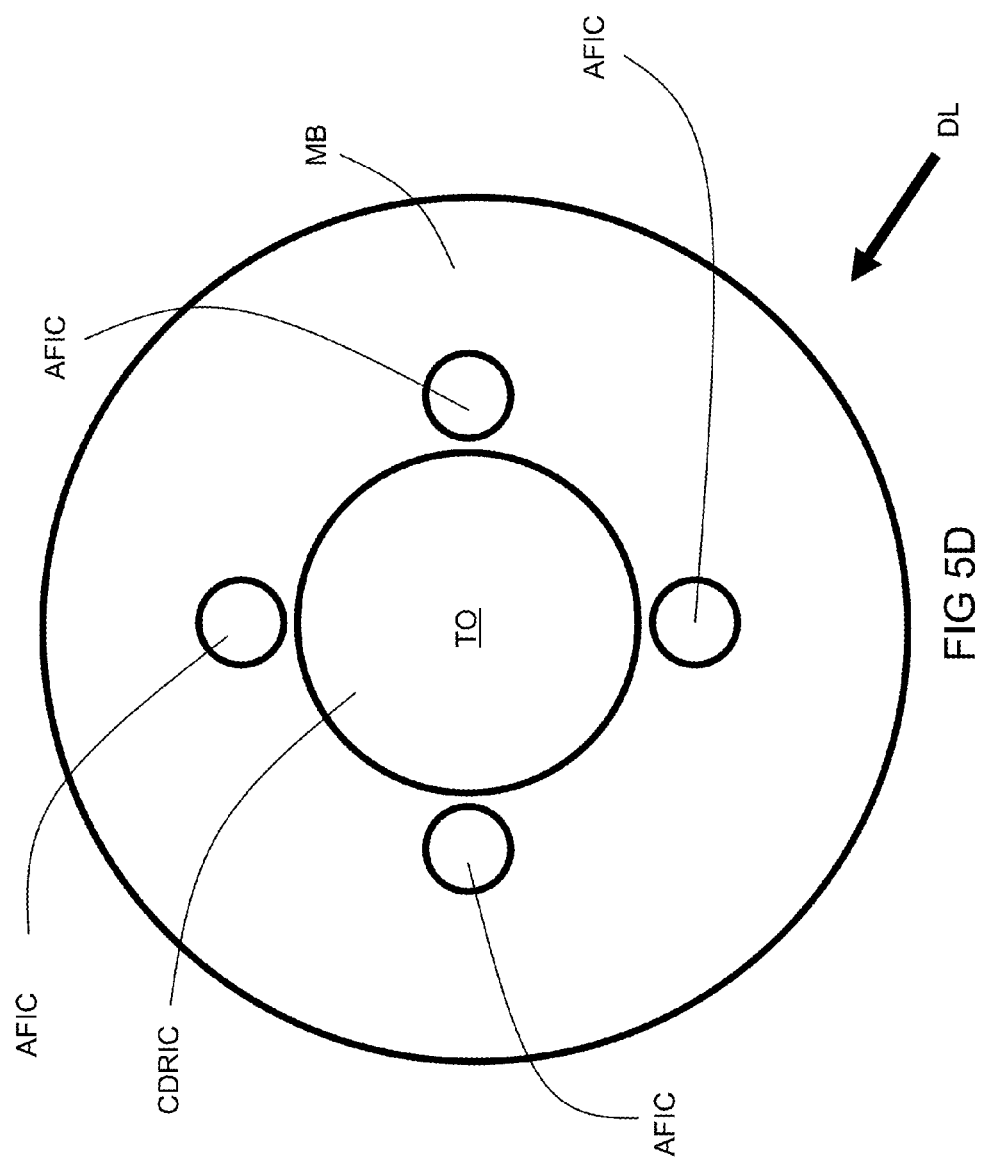

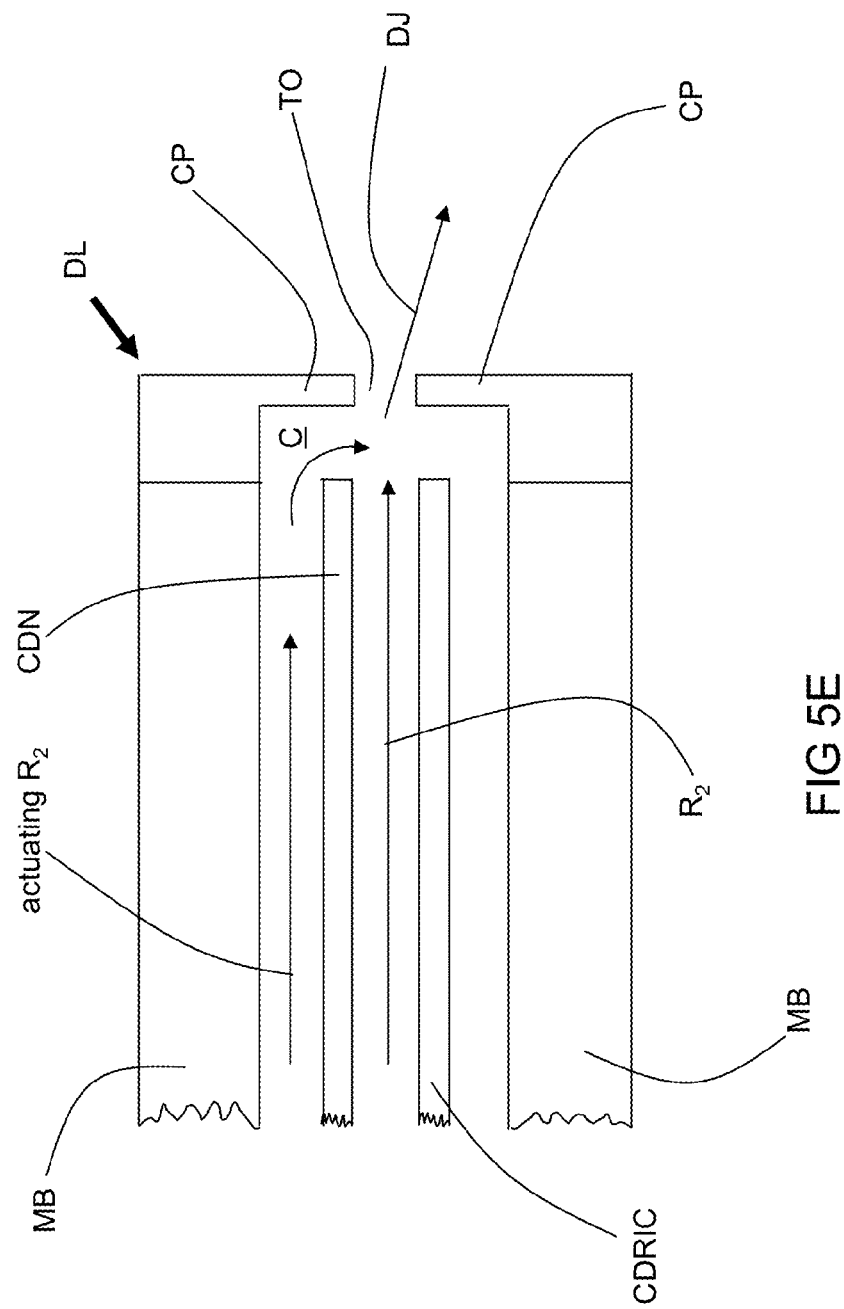

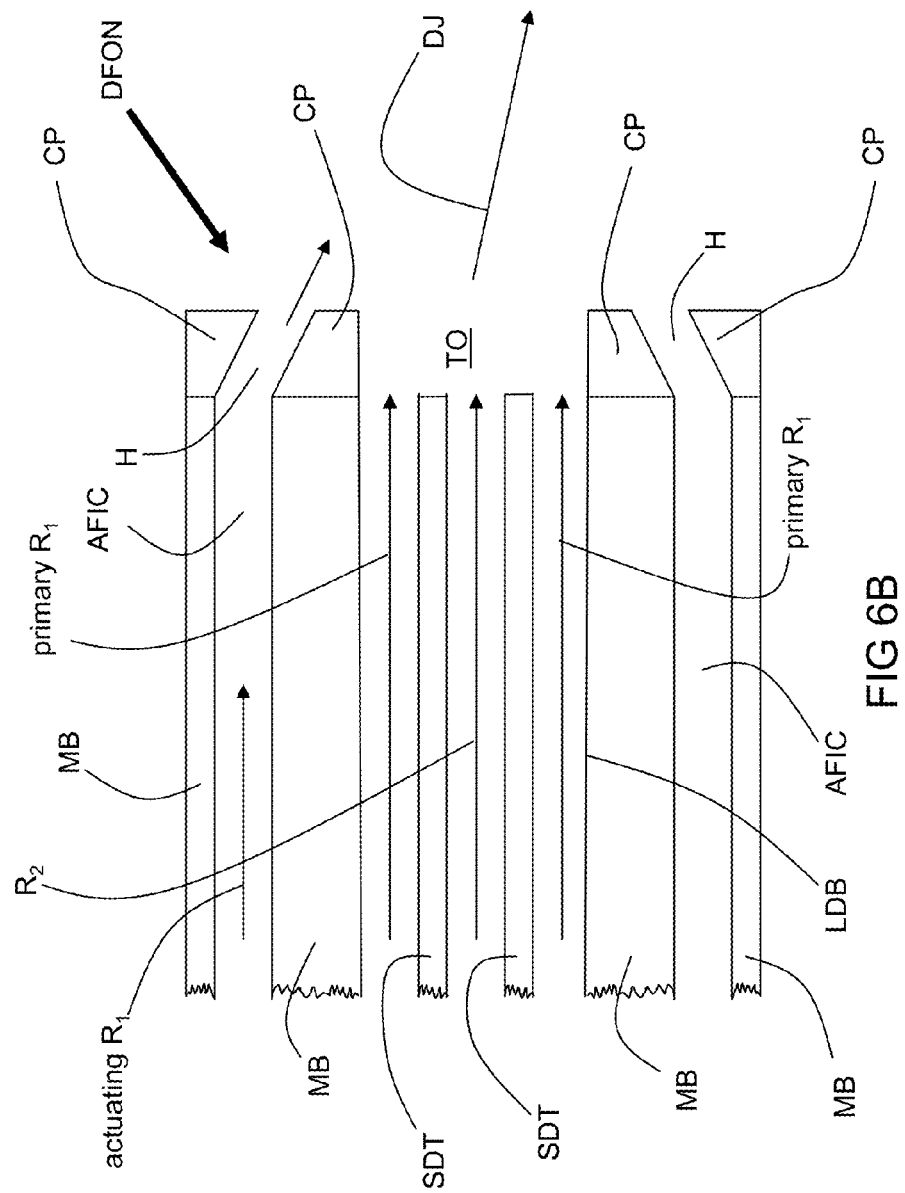

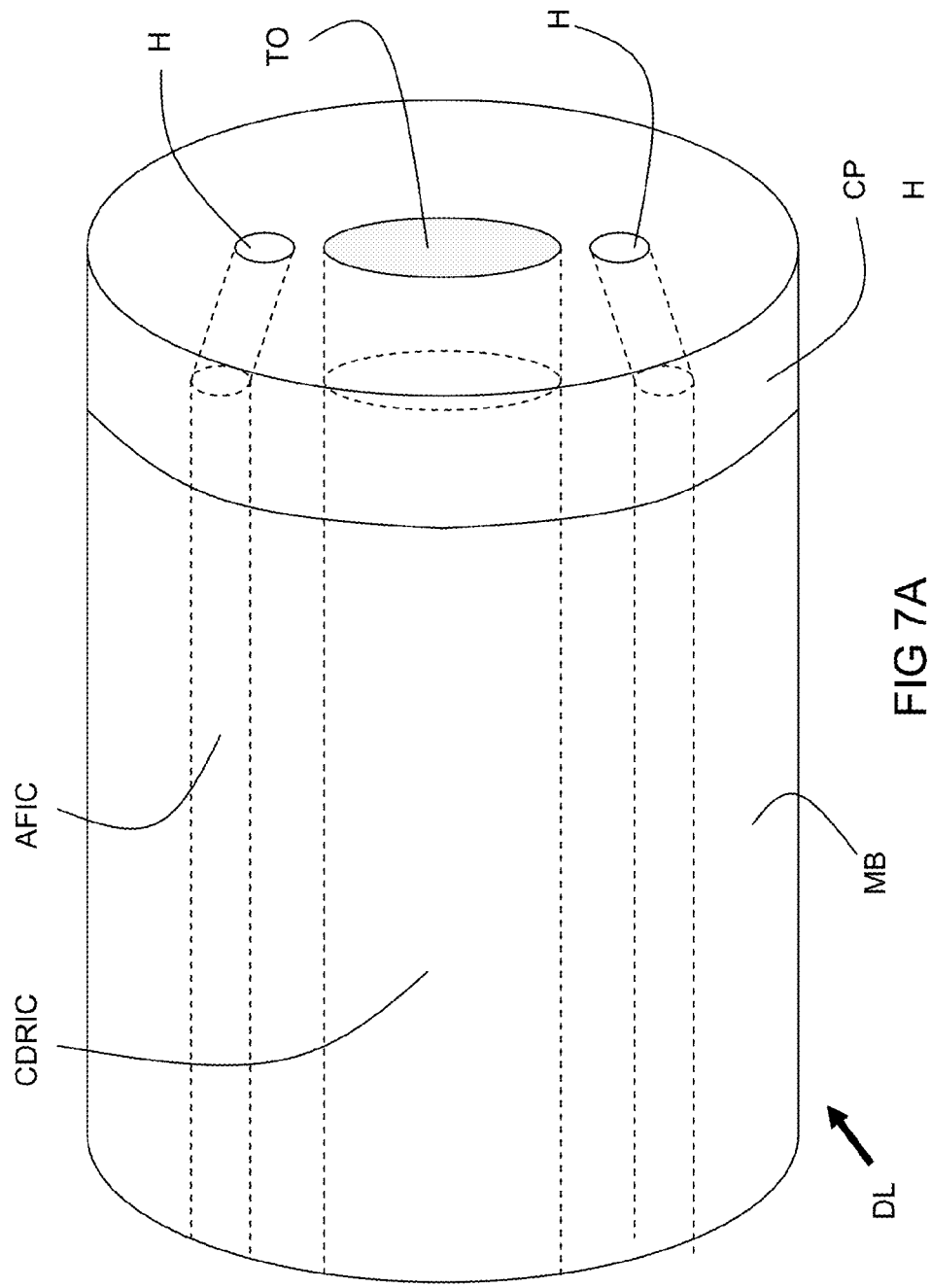

DISTRIBUTED COMBUSTION PROCESS AND BURNER

CROSS-REFERENCE TO RELATED APPLICATIONS

None.

BACKGROUND

Oxy-combustion of fuels is a known strategy for increasing heat utilization (thermal efficiency) in industrial furnaces relative to air-based combustion. Oxy-fuel burners have higher flame temperatures which increase radiative heat transfer from the flame to the load. Higher flame temperatures, however, can have negative consequences in certain circumstances, especially for lower temperature furnaces such as for secondary Aluminum melting. Due to the high flame temperature, the propensity of $NO_x$ formation is increased. Therefore, if $N_2$ enters the combustion zone either through the fuel or due to air infiltration into the furnace, $NO_x$ formation can increase significantly. Also, the higher temperature flame can cause hot spots in the furnace or adversely affect the product quality. In certain cases like melting of Aluminum, the high flame temperature can also increase the rate of metal oxidation, thus resulting in metal losses.

To overcome the above issues, distributed combustion has been developed as a strategy for performing oxy-combustion at lower but very uniform temperatures. Also called diluted combustion, mild combustion, or flameless combustion (in certain circumstances when the flame is no longer visible), the central idea of this strategy is to dilute the reactants with furnace gases (mostly mixture of $H_2O$ and $CO_2$) before combustion so as to achieve a lower and more uniform temperature distribution within the furnace. The temperature of the diluted mixtures should be kept above auto-ignition temperature to sustain the flameless mode. Unlike complex interaction between mass transport and chemical reaction observed in conventional combustion processes, the highly diluted reactants make combustion a kinetic-limited process by increasing time scale of the combustion reaction. This slow combustion process manifests itself through highly distributed reaction zones where the peak temperature is low thereby reducing NOx drastically.

Many have proposed burners for distributed combustion. WO2004/029511 utilizes an ejector effect produced by a burner's oxygen nozzles to provide internal recirculation of furnace gases. Downstream injection of fuel allows the oxygen to mix with the furnace gases before reaching the fuel. WO2004/029511 includes 6 oxygen supply pipes placed in a circle around the fuel injection. The oxygen supply pipes preferably deliver oxygen at supersonic velocities.

As with the WO2004/029511 burner, U.S. Pat. No. 6,007,326 concerns combustion with low concentrations of both fuel and oxygen in the furnace. Dilution of the reactants is obtained with spatially separated injections of them at high velocities. The fuel and the oxidant can be preheated to any temperature above ambient.

U.S. Published Patent Application US 20070254251 discloses a burner designed for a flameless combustion regime. It includes several fuel and oxidant injections, playing different roles. A possible central flame stabilizer is surrounded by multiple nozzles for injecting fuel and gaseous oxidant into the furnace or combustion zone. It can use air or oxygen as oxidant.

Some distributed combustion burners utilizing oxygen must rely upon high velocity injections of the reactants. The high velocity injections normally require high pressures of oxygen and natural gas for operation. Because of this drawback, there is a need to achieve distributed combustion with a burner utilizing oxygen at relatively lower pressures.

Regardless of the pressure of the oxidant supply, distributed combustion is usually achieved by separated injection of fuel and oxidant into the furnace. Either one or both reactant jets are injected into the furnace in such a way as to facilitate entrainment of furnace gases into the jets, e.g. by using high velocity gradients, swirling flows or bluff bodies. The distance between the jets is determined with the objective of achieving sufficient dilution of one or both reactants before the two reactant streams interact/mix with each other. For example, U.S. Pat. No. 5,961,312 discloses a burner design wherein the distance between the fuel and air jets, L, is given by the equation: $(L/D_a) \times [(V_a/V_o)^{0.5}] > 10$, where $D_a$ is the diameter of the air nozzle, $V_a$ is the velocity of air and $V_o$ is unit velocity of air (1 m/s). Similarly, U.S. Pat. No. 6,007,326 requires a distance of at least 6 inches and preferably 24 inches between fuel and oxidant jets to achieve diluted combustion conditions for low $NO_x$ production. These spacing requirements between jets can often make burners prohibitively large and bulky.

Sometimes, a non-zero angle of injection between the reactant nozzles is also used to delay mixing of the reactants until they are diluted by furnace gases. For example, U.S. Pat. No. 5,772,421 discloses a burner design in which the fuel and oxidant are discharged such that they initially diverge away from each other but eventually mix within the furnace. However, the mixing of the diverging jets is dependent upon furnace geometry, burner operation and the location of the burner within the furnace. As a result, these burners are often effective only in certain specific furnaces and under specific operating conditions.

Another strategy to achieve distributed combustion is to distribute one of the reactants in the furnace by using multiple nozzles. The other reactant is usually supplied as a high velocity or high swirl jet to entrain furnace gases. For example, U.S. Pat. No. 6,773,256 discloses a burner in which a small quantity of fuel is supplied into the oxidant stream to achieve a fuel-lean flame. The remaining fuel is supplied via multiple fuel nozzles at fixed distances from the flame. The fuel nozzles can be designed to inject the fuel at different angles to the flame depending on the staging desired. Such a design strategy can result in a relatively large, complex burner that can be relatively expensive to manufacture and hard to control.

Because of the above-described drawbacks, there is a need to achieve distributed combustion with a simple, compact burner.

One of the important conditions for achieving highly staged combustion is high furnace temperature. In order to maintain complete combustion inside the combustion chamber for highly staged combustion, the furnace must be preheated to above the auto-ignition temperature, typically greater than 700° C. or greater than 800° C. Most of the highly staged burners require a preheater burner for achieving desired furnace temperatures prior to staging. For example, WO 2006/031163 discloses a burner that can be operated in both flame and staged mode. Initially when the furnace is cold, fuel and oxidant are injected from coaxial opening (pipe-in-pipe) to have a stable flame. Once the furnace temperature reaches the auto-ignition temperature of fuel, the fuel and oxidant are injected from openings that are spatially separated from each other to have a distributed combustion inside the furnace. The issue with almost all of the staged burner designs is their often poor performance at burner powers other than nominal design power. Typically these burners operate very well at nominal power conditions, however, their combustion efficiency and emission characteristics often decline significantly the moment burner power is changed from nominal to some other power. Such a change in burner power is a very common scenario for most industrial furnaces.

Because of the above-described drawback, there is also a need for a burner that can achieve satisfactory distributed combustion at a variety of burner powers.

SUMMARY

There is disclosed a method of distributed combustion that includes the following steps. A first jet of a primary portion of a first reactant $R_1$ and a primary portion of a second reactants $R_2$ is injected from a fuel-oxidant nozzle into a combustion space. A second jet of a secondary portion of either $R_1$ or $R_2$ is injected from at least one secondary lance into the combustion space. A third jet of actuating fluid is injected close to the first jet and/or the second jet to cause the first to be bent towards the second jet, the second jet of be bent towards the first jet or the first and second jets to be bent towards each other. Either $R_1$ is fuel and $R_2$ is oxidant or $R_1$ is oxidant and $R_2$ is fuel. If the second jet is of $R_1$, after injection of the second jet is initiated, the primary portion of $R_1$ is decreased and the secondary portion of $R_1$ is increased until a desired degree of staging of $R_1$ between the primary and secondary portions is achieved. If the second jet is of $R_2$, after injection of the second jet is initiated, the primary portion of $R_2$ is decreased and the secondary portion of $R_2$ is increased until a desired degree of staging of $R_2$ between the primary and secondary portions is achieved.

There is also disclosed another method of distributed combustion that includes the following steps. A first jet of combustion reactants comprising a primary portion of an oxidant and a primary portion of a fuel is injected from a dynamical fuel-oxidant nozzle into a combustion space. A second jet of a secondary portion of one of the combustion reactants is injected from at least one secondary lance into the combustion space. A third jet of fuel is injected close to the first jet to cause the first jet to be bent towards the second jet. Either the primary portion of oxidant enshrouds the primary portion of fuel or the primary portion of fuel enshrouds the primary portion of oxidant. The combustion reactant of the second jet is the same as the combustion reactant that is injected annularly around the other combustion reactant in the first jet. After injection of the second jet is initiated, the primary portion of the annularly enshrouding combustion reactant is decreased and the secondary portion of that same reactant is increased until a desired degree of staging of that type of reactant between the primary and secondary portions is achieved.

There is also disclosed another method of distributed combustion that includes the following steps. A first jet of combustion reactants comprising a primary portion of an oxidant and a primary portion of a fuel is injected from a fuel-oxidant nozzle into a combustion space, wherein either the primary portion of oxidant enshrouds the primary portion of fuel or the primary portion of fuel enshrouds the primary portion of oxidant. A second jet of a secondary portion of one of the combustion reactants is injected from at least one dynamical lance into the combustion space, the combustion reactant of the second jet being the same as the combustion reactant that is injected annularly around the other combustion reactant in the first jet. A third jet of actuating fluid is injected close to the second jet to cause the second jet to be bent towards the first jet. If the second jet is of oxidant, after injection of the second jet is initiated, the primary portion of oxidant is decreased and the secondary portion of oxidant is increased until a desired degree of staging of overall oxidant between the primary and secondary portions is achieved. If the second jet is of fuel, after injection of the second jet is initiated, the primary portion of the fuel is decreased and the secondary portion of the fuel is increased until a desired degree of staging of overall fuel between the primary and secondary portions is achieved.

There is also disclosed a system for achieving distributed combustion, comprising: a source of oxidant; a source of fuel; a source of actuating fluid; a burner block; a fuel-oxidant nozzle inserted into the burner block; and at least one secondary lance inserted into the burner block. The fuel-oxidant nozzle comprises a main nozzle body having a larger diameter bore extending therethrough, a smaller diameter tube extending therethrough that is concentrically disposed within the larger diameter bore, and at least one actuating fluid channel extending therethrough that is spaced from the larger diameter bore, an interior of the smaller diameter tube defining a centrally disposed reactant injection channel, an interior surface of the larger diameter bore and an outer surface of the smaller diameter tube defining an annularly-shaped reactant injection channel. The fuel-oxidant nozzle further comprises a cap covering a terminal end of the main nozzle body disposed distal to the burner block, the cap comprising a first face facing the terminal end of the main nozzle body and second face facing away from the burner block, the cap further comprising a terminal opening in fluid communication with the centrally disposed and annularly-shaped reactant injection channels and having a diameter corresponding to that of the larger diameter bore, the cap further comprising a cavity in fluid communication with the at least one actuating fluid injection channel and either the second face or the terminal opening. The at least one secondary lance comprises a centrally disposed nozzle. The source of oxidant is in fluid communication with either the centrally disposed reactant injection channel or the annularly shaped reactant channel. If the source of oxidant is in fluid communication with the centrally disposed reactant injection channel, the source of fuel is in fluid communication with the annularly shaped reactant injection channel and the source of oxidant is in additional fluid communication with the centrally disposed nozzle of the at least one secondary lance. If the source of oxidant is in fluid communication with the annularly shaped reactant injection channel, the source of fuel is in fluid communication with the centrally disposed reactant injection channel and the source of fuel is in additional fluid communication with the centrally disposed nozzle of the at least one secondary lance. The actuating fluid injection channel and cap cavity are adapted to direct a flow of actuating fluid from the fluid injection channel and inject it at an angle towards a jet of fuel and oxidant injected from the reactant injection channels to divert said fuel/oxidant jet away from its normal axis.

There is also disclosed another system for achieving distributed combustion, comprising: a source of oxidant; a source of fuel; a source of actuating fluid; a burner block; a fuel-oxidant nozzle inserted into the burner block, and at least one dynamical lance inserted into the burner block. The fuel-oxidant nozzle comprises: a main nozzle body having a larger diameter bore extending therethrough, a smaller diameter tube extending therethrough that is concentrically disposed within the larger diameter bore, an interior of the smaller diameter tube defining a centrally disposed reactant injection channel, an interior surface of the larger diameter bore and an outer surface of the smaller diameter tube defining an annularly-shaped reactant injection channel. The at least one dynamical lance comprises a main nozzle body having a reactant injection bore extending therethrough and at least one actuating fluid injection channel spaced from the reactant injection bore, the at least one dynamical lance further comprising a cap covering a terminal end of the main nozzle body disposed distal to the burner block, the cap comprising a first face facing the terminal end of the main nozzle body and second face facing away from the burner block, the cap further comprising a terminal opening in fluid communication with the reactant injection bore and having a diameter corresponding to that of the reactant injection bore, the cap further comprising a cavity in fluid communication with the at least one actuating fluid injection channel and either the second face or the terminal opening. The source of oxidant is in fluid communication with either the centrally disposed reactant injection channel or the annularly shaped reactant channel. If the source of oxidant is in fluid communication with the centrally disposed reactant injection channel, the source of fuel is in fluid communication with the annularly shaped reactant injection channel and the source of oxidant is in additional fluid communication with the centrally disposed nozzle of the at least one dynamical lance. If the source of oxidant is in fluid communication with the annularly shaped reactant injection channel, the source of fuel is in fluid communication with the centrally disposed reactant injection channel and the source of fuel is in additional fluid communication with the centrally disposed nozzle of the at least one dynamical lance. The actuating fluid injection channel is adapted to direct a flow of actuating fluid from the fluid injection channel and inject it at an angle towards the combustion reactant injected from the at least one dynamical to divert said fuel/oxidant jet away from its normal axis.

The methods and/or systems may be used with one another and may include one or more of the following aspects.

the primary portion of $R_2$ annularly enshrouds the primary portion of $R_1$.

$R_2$ is oxidant and $R_1$ is fuel.

the oxidant is oxygen.

the fuel is natural gas.

the fuel is fuel oil.

the oxidant is air.

the first jet is bent towards the second jet.

the first jet is bent towards the second jet, the second jet is of $R_2$, and the actuating fluid is $R_1$.

the second jet is bent towards the first jet, the second jet is of $R_2$, and the actuating fluid is $R_2$.

the jet being bent is bent from an initial injection axis to a bent injection axis and the initial and bent axes describe an angle θ of up to 40°

θ is up to 15°.

the secondary portion of $R_1$ or $R_2$ makes up 90-95% of a total amount of that reactant yield a desired degree of staging is 90-95%.

flameless combustion is achieved at the desired degree of staging.

the first jet is bent towards the second jet; the primary portion of $R_2$ annularly enshrouds the primary portion of $R_1$; the actuating fluid is $R_1$; and the actuating fluid makes up 1-20% of the total flow of $R_1$ from the fuel-oxidant nozzle.

the second jet is bent towards the first jet; the primary portion of $R_2$ annularly enshrouds the primary portion of $R_1$; the actuating fluid is $R_2$; and the actuating fluid makes up 1-20% of the total flow of $R_2$ from the secondary lance.

the at least one secondary lance comprises first and second secondary lances disposed at a same vertical distance from the fuel-oxidant nozzle and at a same horizontal distance from the fuel-oxidant nozzle and opposite sides thereof.

$R_2$ enshrouds $R_1$ in the first jet; $R_2$ is oxidant and $R_1$ is fuel; the first jet is bent towards the second jet; the actuating fluid is $R_2$; at a nominal burner power, a velocity of the third jet is 100 m/s; at a nominal burner power, a velocity of the primary portion of the fuel is 100-200 m/s; at a nominal burner power, a velocity of the primary portion of the oxidant is 75-150 m/s; and at a nominal burner power, a velocity of the secondary portion of the oxidant is 75-200 m/s.

the amount of the secondary portion of $R_1$ or $R_2$ is increased and the amount of the primary portion of that reactant is decreased until an auto-ignition temperature of the fuel and oxidant is reached inside the combustion space.

said method is performed in a heating phase and a distributed combustion phase; heat of the combustion of the fuel and oxidant is used to melting a charge during the heating phase; once a desired temperature is reached in the combustion space, a transition from the heating phase to the distributed combustion phase is commenced; during the transition, said step of injecting the third jet is initiated; the primary portion of $R_1$ or $R_2$ is decreased and the respective secondary portion of $R_1$ or $R_2$, respectively is increased during the transition; and the transition ends when the desired degree of staging is achieved and the distributed combustion phase begins.

the primary portion of oxidant annularly enshrouds the primary portion of fuel and the combustion reactant of the second jet is oxidant.

the primary portion of fuel annularly enshrouds the primary portion of oxidant and the combustion reactant of the second jet is fuel; and the secondary portion of fuel makes up 90-95% of a total amount of fuel to yield a desired degree of staging is 90-95%.

the source of oxidant is in fluid communication with the annularly shaped reactant injection channel.

the source of oxidant is in fluid communication with the centrally disposed reactant injection channel.

said at least one secondary lances comprises first and second secondary lances disposed at a same vertical distance from the fuel-oxidant nozzle and at a same horizontal distance from the fuel-oxidant nozzle and opposite sides thereof.

the smaller diameter tube has a diameter $D_1$ and the centrally disposed nozzle of each of the first and secondary lances has a diameter $D_2$ and axial centers of the first and second secondary lances are separated by a distance x which is at least 10 times the smaller of $D_1$ and $D_2$.

an axial center of the fuel-oxidant nozzle is separated from the axial centers of the first and second secondary lances by a vertical distance equal to x.

the cap cavity is in fluid communication between the at least one actuating fluid injection channel and the terminal opening and the actuating fluid injection channel and cavity are adapted so that a jet of actuating fluid injected from the actuating fluid injection channel is redirected by the cavity at an angle towards a jet of fuel and oxidant from the reactant injection channels at a point within the terminal opening.

the cap cavity is in fluid communication between the at least one actuating fluid injection channel and the second face of the cap and the actuating fluid injection channel and cavity are adapted so that a jet of actuating fluid injected from the actuating fluid injection channel is redirected by the cavity at an angle towards a jet of fuel and oxidant from the reactant injection channels at a point downstream of the terminal opening.

the second jet is bent is bent from an initial injection axis to a bent injection axis and the initial and bent axes describe an angle θ of up to 40° the secondary portion of the combustion reactant injected by the at least one dynamical makes up 90-95% of a total amount of that reactant to yield a desired degree of staging is 90-95%.

the actuating fluid is the oxidant; and the actuating fluid makes up 1-20% of the total flow of oxidant from the at least one dynamical lance.

the actuating fluid is the fuel; and the actuating fluid makes up 1-20% of the total flow of the fuel from the at least one dynamical lance.

the at least one dynamical lance comprises first and second dynamical lances disposed at a same vertical distance from the fuel-oxidant nozzle and at a same horizontal distance from the fuel-oxidant nozzle and opposite sides thereof.

the actuating fluid is the oxidant; at a nominal burner power, a velocity of the third jet is 100 m/s; at a nominal burner power, a velocity of the primary portion of the fuel is 100-200 m/s; at a nominal burner power, a velocity of the primary portion of the oxidant is 75-150 m/s; and at a nominal burner power, a velocity of the secondary portion of the oxidant is 75-200 m/s.

the source of oxidant is in fluid communication with the annularly shaped reactant injection channel.

the source of oxidant is in fluid communication with the centrally disposed reactant injection channel.

said at least one dynamical lance comprises first and second dynamical lances disposed at a same vertical distance from the fuel-oxidant nozzle and at a same horizontal distance from the fuel-oxidant nozzle and opposite sides thereof.

the smaller diameter tube has a diameter $D_1$ and the centrally disposed nozzle of each of the first and dynamical lances has a diameter $D_2$ and axial centers of the first and second secondary lances are separated by a distance x which is at least 10 times the smaller of $D_1$ and $D_2$.

an axial center of the fuel-oxidant nozzle is separated from the axial centers of the first and second dynamical lances by a vertical distance equal to x.

the cap cavity is in fluid communication between the at least one actuating fluid injection channel and the terminal opening and the actuating fluid injection channel and cavity are adapted so that a jet of actuating fluid injected from the actuating fluid injection channel is redirected by the cavity at an angle towards a jet of fuel or oxidant from the reactant injection bore at a point within the terminal opening.

the cap cavity is in fluid communication between the at least one actuating fluid injection channel and the second face of the cap and the actuating fluid injection channel and cavity are adapted so that a jet of actuating fluid injected from the actuating fluid injection channel is redirected by the cavity at an angle towards a jet of fuel or oxidant from the reactant injection bore at a point downstream of the terminal opening.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a schematic elevation view of a first embodiment of the disclosed burner illustrating hidden parts that includes a dynamical lance and a fuel/oxidant nozzle.

FIG. 2A is a schematic elevation view of a second embodiment of the disclosed burner illustrating hidden parts that includes a dynamical fuel/oxidant nozzle and a secondary reactant lance.

FIG. 2B is a schematic elevation view of the burner of FIG. 2A wherein spatial relationships between the dynamical fuel-oxidant nozzle and secondary lance are characterized.

FIG. 2C is a schematic elevation view of a second embodiment of the disclosed burner illustrating hidden parts that includes a dynamical fuel/oxidant nozzle and two secondary reactant lances wherein certain nozzle distances are characterized.

FIG. 3A is a schematic of the disclosed distributed combustion process during a heating phase where the non-divertable jet is injected by a fuel-oxidant nozzle.

FIG. 3C is a schematic of the process of FIGS. 3A-B during the distributed combustion phase where the non-divertable jet is injected by a fuel-oxidant nozzle and the divertable jet is injected by a dynamic lance.

FIG. 3D is a schematic of the disclosed distributed combustion process during a heating phase where the divertable jet is injected by a dynamical fuel-oxidant nozzle.

FIG. 3G is a schematic of the disclosed distributed combustion process during a heating phase where the divertable jet is injected by a dynamical fuel-oxidant nozzle.

FIG. 4B is a cross-sectional view of the nozzle of FIG. 4A taken along line B-B illustrating hidden parts.

FIG. 4D is a cross-sectional view of the nozzle of FIG. 4A taken along line D-D.

FIG. 4E is a schematic elevation view of a lengthwise slice taken of the nozzle of FIG. 4A.

FIG. 5A is a schematic isometric view of a first embodiment of a dynamical lance of the disclosed burner.

FIG. 5B is a cross-sectional view of the dynamical lance of FIG. 5A taken along line B-B illustrating hidden parts.

FIG. 5C is a cross-sectional view of the dynamical lance of FIG. 5A taken along line C-C illustrating hidden parts.

FIG. 5D is a cross-sectional view of the dynamical lance of FIG. 5A taken along line D-D.

FIG. 5E is a schematic elevation view of a lengthwise slice taken of the dynamical lance of FIG. 5A.

FIG. 6B is a schematic elevation view of a lengthwise slice taken of the nozzle of FIG. 6A.

FIG. 7A is a schematic isometric view of a first embodiment of a dynamical lance of the disclosed burner.

DESCRIPTION OF PREFERRED EMBODIMENTS

Figure 3B:
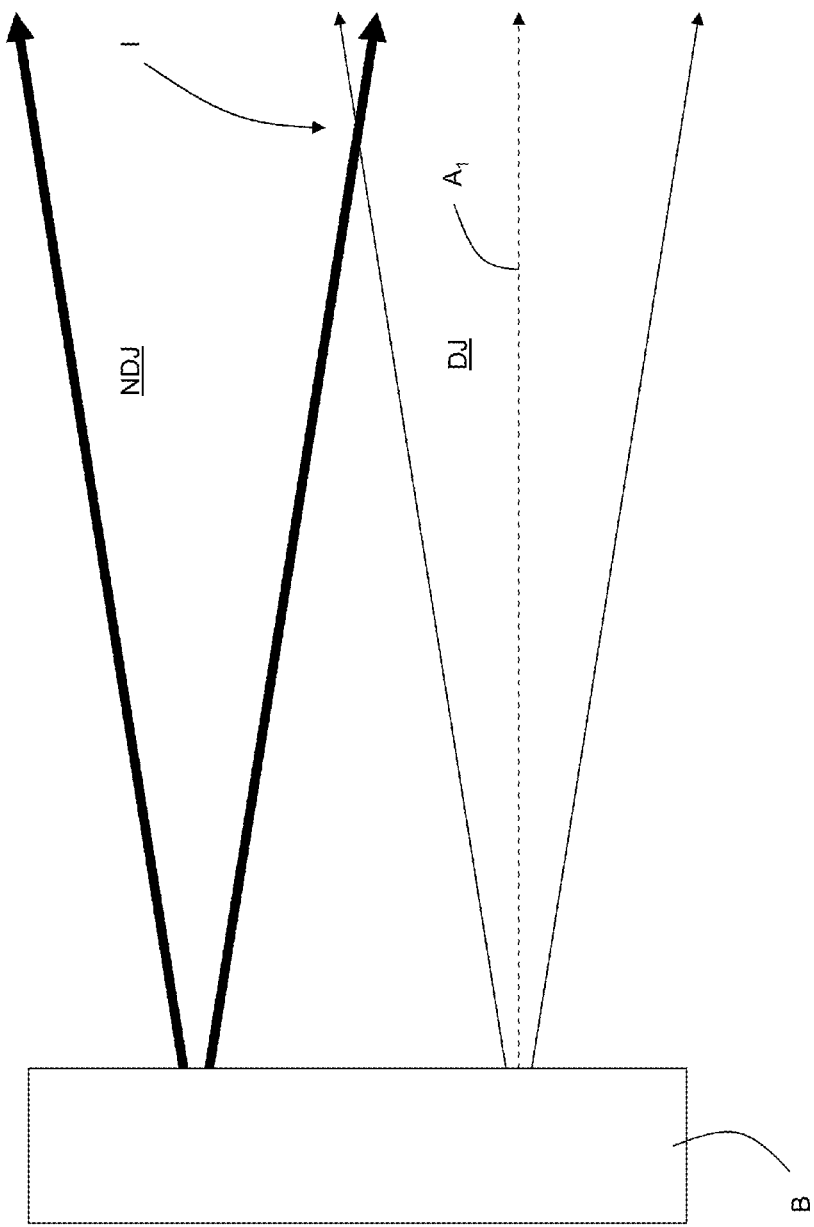
FIG. 3B is a schematic of the process of FIG. 3A during a transition from the heating phase to a distributed combustion phase where the non-divertable jet is injected by a fuel-oxidant nozzle and the divertable jet is injected by a dynamic lance.

There is disclosed a simple, compact burner for distributed combustion that achieves wide distribution of one of the reactants (fuel or oxidant) in the furnace through fluidic vectoring of jets achieved with use of a dynamical lance or dynamical fuel-oxidant nozzle. In a distributed combustion phase, the dynamical lance or dynamical fuel-oxidant nozzle uses an actuating fluid (typically the actuating fluid is the fuel, oxidant, or an inert gas such as recycled flue gas) instead of moving mechanical parts to bend/divert/vary the direction of supply of predominantly or fully just one of the reactants and hence has the ability to spread that reactant over a much larger available volume than that achieved by a single lance of fuel-oxidant nozzle with a fixed direction of reactant supply. Mixing of this predominantly single or fully single reactant from the dynamical fuel-oxidant nozzle or dynamical lance with the other type of reactant (injected from either a secondary lance or fuel-oxidant nozzle, respectively or from a dynamical lance or dynamical fuel-oxidant nozzle, respectively) is delayed because the diverted/bent jet of one of the reactants allows that reactant to become entrained with furnace gases before it mixes with the other reactant.

During a first phase (the heating phase) of operation of the disclosed distributed combustion process, fuel and an oxidant are injected through a tube-in-tube type fuel/oxidant nozzle as a jet of one reactant enshrouded by the other reactant into the combustion chamber (such as an industrial furnace) where they are combusted. This enshrouded jet may be injected through a dynamical fuel/oxidant nozzle or through a non-dynamical fuel/oxidant nozzle. A "dynamical" fuel-oxidant nozzle means that the jet of fuel-shrouded oxidant or oxidant-shrouded fuel may be bent/diverted with use of an actuating fluid, while a "non-dynamical" fuel-oxidant nozzle means that the fuel-shrouded oxidant or oxidant-shrouded fuel may not be bent/diverted (i.e., no provision is made for actuating fluid). During the heating phase, the jet of fuel and oxidant is not fluidically bent by the actuating fluid.

The heating phase is continued until an auto-ignition temperature of the fuel and oxidant, typically greater than 700° C. or greater than 800° C.

The dynamical or non-dynamical fuel-oxidant nozzle supplies a primary portion of one of the reactants. In order to ultimately achieve distributed combustion, a staged secondary portion of that reactant needs to be introduced into the combustion chamber during a transition from the heating phase to a second phase of operation (distributed combustion phase), while the primary portion of that reactant (from the dynamical or non-dynamical fuel-oxidant nozzle) is reduced. When a dynamical fuel-oxidant nozzle is used, the secondary portion of reactant may be injected through a secondary lance or a dynamical lance. When a non-dynamical fuel-oxidant nozzle is used, the secondary portion of reactant may be injected through a dynamical lance. At the beginning of the transition period, the secondary portion of the reactant is introduced in a small amount either through the secondary lance (in the case of a dynamical fuel-oxidant nozzle) or through a dynamical lance (in the case of a dynamical or non-dynamical fuel/oxidant nozzle). At the same time, and in order to maintain a same overall flowrate of the reactant at issue into the combustion space, injection of the primary portion of that reactant from the dynamical or non-dynamical fuel/oxidant nozzle is decreased by a corresponding amount. As this transition from the heating phase to the distributed combustion phase is continued, the amount of secondary portion is further increased and the amount of primary portion is further decreased. This continues until a desired portion (i.e., desired staging) of that reactant is being injected as the secondary portion (from the secondary lance or dynamical lance) in comparison to the amount of the primary portion of that reactant.

During the transition from the first to second phase, a valve is opened to allow a flow of an actuating fluid through one or more actuating fluid injection channels formed in a main nozzle body of the dynamical lance or the dynamical fuel/oxidant nozzle. The actuating fluid is injected at an angle towards the reactant that is injected as a jet from a centrally disposed nozzle (in the case of a dynamical lance) or at an angle towards the fuel and oxidant injected as a jet (in the case of a tube-in-tube type dynamical fuel/oxidant nozzle).

In the case of a dynamical lance only injecting a single type of reactant, the injected jet of actuating fluid may intersect the jet of the single reactant before that single reactant exits the dynamical lance (first embodiment). Alternatively, the jet of actuating fluid may intersect the jet of the single reactant after that single reactant has exited the dynamical lance (second embodiment).

In the first embodiment of intersection of the actuating fluid and jet of single reactant, the dynamical lance may employ a main nozzle body having a centrally disposed reactant injection channel and one or more actuating fluid injection channels extending therethrough spaced apart from the centrally disposed reactant injection channel. The terminus of the main nozzle body is covered with and joined to a cap. The cap has a terminal opening oriented along the axis of the centrally disposed injection channel and generally sized to match a diameter thereof so that the flow of the single reactant through the centrally disposed reactant injection channel continues through the terminal opening of the cap. The cap may include a cavity on the side facing the terminus of the nozzle body. The cavity extends in the axial direction of the cap (upstream to downstream) to terminate at a flat surface lying in a plane perpendicular to the axis of the dynamical lance. The cavity also extends in the radial direction outward far enough so that it fluidly communicates with the outlet of the actuating fluid channel(s). Thus, as the actuating fluid exits the actuating fluid channel, the flat surface of the cavity redirects the direction of the flow of actuating fluid so that it intersects the flow of the reactant being injected from the centrally disposed nozzle at about a right angle. Instead of a cavity, the cap may be drilled with holes whose ends match up between the outlets of the actuating fluid injection channels and the inner surface of the terminal opening of the cap. Thus, the reactant flows out the terminal end of the centrally disposed reactant injection channel and through the terminal end of the cap in the form of a jet while the actuating fluid flows from the outlet of the actuating fluid injection channel(s) into the hole(s) and, in the form of a jet intersects, at an angle, the jet of the reactant inside the terminal opening. Regardless of whether a cavity or holes are employed, because the jet of actuating fluid intersects the jet of the reactant, the reactant jet is caused to be bent/diverted in a direction away from the jet of actuating fluid. The direction and angle of bending/diversion may be controlled by injecting actuating fluid through the appropriate actuating fluid injection channel at the appropriate velocity. For example, the jet of reactant may be bent/diverted downwardly by injecting actuating fluid through an actuating fluid injection channel positioned above the centrally disposed reactant injection channel. If the jet is to instead be bent to the right-hand side of the burner, the actuating fluid is instead injected from an actuating fluid injection channel located to the left of the reactant injection channel.

In the second embodiment of intersection of the actuating fluid and jet of single reactant, the dynamical lance may employ a main nozzle body having a centrally disposed reactant injection channel and one or more actuating fluid injection channels extending therethrough spaced apart from the centrally disposed reactant injection channel. The terminus of the main nozzle body is covered with and is joined to a cap. The cap has a terminal opening oriented along the axis of the centrally disposed injection channel and generally sized to match a diameter thereof so that the flow of the single reactant through the centrally disposed reactant injection channel continues through the terminal opening of the cap. The cap also therethrough, a first end of which matches up with an outlet of a respective actuating fluid injection channel and a second end of which extends through the terminal end of the cap spaced away from the terminal opening of the cap. The holes are drilled at an angle towards the axis of the centrally disposed nozzle, but the hole does not intersect the terminal opening of the cap. Thus, the reactant flows out the terminal end of the centrally disposed reactant injection channel and through the terminal opening in the form of a jet while the actuating fluid flows from the outlet of the actuating fluid injection channel(s) into the hole(s) and exits out the cap in the form of a jet at an angle to the jet of reactant. The jet of actuating fluid intersects the jet of reactant after the reactant has exited the dynamical lance. Because the jet of actuating fluid intersects the jet of the reactant, the jet of reactant is caused to be bent/diverted in a direction away from the jet of actuating fluid. The, the direction and angle of bending/diversion may be controlled by injecting actuating fluid through the appropriate actuating fluid injection channel at the appropriate velocity. For example, the jet of reactant may be bent/diverted downwardly by injecting actuating fluid through an actuating fluid injection channel positioned above the centrally disposed reactant injection channel. If the jet is to instead be bent to the right-hand side of the burner, the actuating fluid is instead injected from an actuating fluid injection channel located to the left of the reactant injection channel.

Regardless of whether the jet of actuating fluid intersects the jet of the reactant before or after it has exited the dynamical lance, the actuating fluid may be the fuel, the oxidant, or any inert gas, such as recycled flue gas. Typically, the actuating fluid is the same reactant that is injected by the dynamical lance. For example, the oxidant may be injected as a jet from the dynamical lance and also as a jet of actuating fluid or the fuel may be injected as the jet from the dynamical lance and also as a jet of actuating fluid.

In the case of a dynamical fuel-oxidant nozzle injecting both types of reactant (i.e., both fuel and oxidant), the injected jet of actuating fluid may intersect the jet of fuel and oxidant before they exit the dynamical lance (first embodiment). Alternatively, the jet of actuating fluid may intersect the jet of the fuel and oxidant after they exit the dynamical lance (second embodiment).

In the first embodiment of intersection of the actuating fluid and jet of single reactant, the dynamical fuel-oxidant nozzle may employ a main nozzle body having a centrally disposed larger-diameter bore extending therethrough. Concentrically disposed within the large-diameter bore is a smaller-diameter tube so as to create a centrally disposed reactant injection channel surrounded by an annularly-shaped reactant injection channel. Hence, it forms a tube-in-tube type configuration where an annular flow of one type of reactant flows in an annular space between an inner surface of the main nozzle body and an outer surface of the tube and a central flow of the other type of reactant flows through the tube. The main nozzle body also includes one or more actuating fluid injection channels extending therethrough that are spaced apart from the annular space. The terminus of the main nozzle body is covered with a cap. The cap has a terminal opening oriented along the axis of the tube and bore and generally sized to match the diameter of the bore so that the flow of one reactant annularly shrouding the other reactant continues through the terminal opening of the cap. The cap may include a cavity on the side facing the terminus of the nozzle body. The cavity extends in the axial direction of the cap (upstream to downstream) to terminate at a flat surface lying in a plane perpendicular to the axis of the dynamical fuel-oxidant nozzle. The first and second reactants flow out the terminal ends of the tube and annular space and out the terminal opening in the cap. The cavity also extends in the radial direction outward far enough so that it fluidly communicates with the outlet of the actuating fluid channel(s). Thus, as the actuating fluid exits the actuating fluid channel, the flat surface of the cavity redirects the direction of the flow of actuating fluid so that it intersects the flow of the fuel and oxidant at about a right angle. Instead of a cavity, the cap may be drilled with holes whose ends match up between the outlets of the actuating fluid injection channels and the terminal opening of the cap. Thus, the actuating fluid flows from the outlet of the actuating fluid injection channel(s) into the hole(s) and intersects, at an angle, the flow of the fuel and oxidant. The angle may be a right angle or an acute angle greater than 0°. Because the jet of actuating fluid (injected from the hole or into the cavity and towards the terminal opening) intersects the jet of the first and second reactant, the jet of these reactants is caused to be bent/diverted in a direction away from the jet of actuating fluid. The direction and angle of bending/diversion may be controlled by injecting actuating fluid through the appropriate actuating fluid injection channel at the appropriate velocity. For example, the jet of reactants may be bent/diverted downwardly by injecting actuating fluid through an actuating fluid injection channel positioned above the centrally disposed reactant injection channel. If the jet is to instead be bent to the right-hand side of the burner, the actuating fluid is instead injected from an actuating fluid injection channel located to the left of the reactant injection channel.

In the second embodiment of intersection of the actuating fluid and jet of first and second reactant, the dynamical fuel-oxidant nozzle may employ a main nozzle body again having a centrally disposed large-diameter bore and a smaller-diameter tube concentrically disposed within the large-diameter bore. Again, one of the reactants flows through the tube while the other reactant flows through the annular space in between an inner surface of the bore and the outer surface of the tube to annularly shroud that reactant at the outlet of the tube and bore. The dynamical fuel-oxidant nozzle also includes one or more actuating fluid injection channels extending therethrough main nozzle body. The terminus of the main nozzle body is covered with a cap. The cap has a terminal opening oriented along the axis of the centrally disposed bore and tube and generally sized to match a diameter of the bore so that the flow of the fuel and oxidant through the centrally disposed concentric tubes continues through the terminal opening of the cap. The cap also includes holes drilled through it, a first end of which matches up with an outlet of a respective actuating fluid injection channel and a second end of which extends through the terminal end of the cap spaced away from the terminal opening of the cap. The holes are drilled at an acute angle towards the axis of the centrally disposed concentric tubes, but the holes do not intersect the terminal opening of the cap. Thus, the actuating fluid flows from the outlet of the actuating fluid injection channel(s) into the hole(s) and exits out the cap in the form of a jet at an angle to the jet of the first and second reactants. The jet of actuating fluid intersects the jet of the first and second reactants after they exit the dynamical fuel-oxidant nozzle. Because the jet of actuating fluid intersects the jet of the first and second reactants, the jet of the first and second reactants is caused to be bent/diverted in a direction away from the jet of actuating fluid. The direction and angle of bending/diversion may be controlled by injecting actuating fluid through the appropriate actuating fluid injection channel at the appropriate velocity. For example, the jet of reactants may be bent/diverted downwardly by injecting actuating fluid through an actuating fluid injection channel positioned above the centrally disposed reactant injection channel. If the jet is to instead be bent to the right-hand side of the burner, the actuating fluid is instead injected from an actuating fluid injection channel located to the left of the reactant injection channel.

Regardless of whether the jet of actuating fluid intersects the jet of the fuel and oxidant before or after they exit the dynamical fuel-oxidant nozzle, the actuating fluid may be the fuel, the oxidant, or any inert gas, such as recycled flue gas. Typically but not necessarily, the actuating fluid is the same reactant that flows through the tube. For example, when the fuel annularly shrouds the oxidant, the actuating fluid is the oxidant. As another example, when the oxidant annularly shrouds the fuel, the actuating fluid is the fuel.

While the injection of the actuating fluid may be initiated at any time during the transition, flame stability may be enhanced if it is initiated closer to the conclusion of the transition as opposed to the beginning of the transition, and especially as the amount of second reactant is injected through the secondary or dynamical lance starts to reach the desired fraction of overall second reactant (i.e., the desired degree of staging is reached).

Because the points of injection of the two jets are spaced apart, the bent/diverted jet/jets has/have a greater opportunity to entrain furnace gases and thus becomes diluted before it/they reacts/react with the other portion of reactant injected by the burner in primary and secondary portions. Such dilution results in a lower overall temperature within the furnace and a greater temperature homogeneity within the furnace. Thus, it results in distributed combustion, and in some cases flameless combustion.

Processes and devices for fluidically bending a jet of fluid are known, such as those taught by U.S. Published Patent Application No. US 20100068666 A1, the contents of which are incorporated herein in its entirety. Typically, the jet of second reactant or enshrouded jet of fuel and oxidant is bent from its normal axis up to 40°, more typically up to 30°, even more typically up to 20°, yet more typically up to 15°, and most typically up to 5° or 10°.

The geometry of the furnace and the burner power may have an effect upon the degree of furnace gas entrainment within the bent jet. In other words, if the jet is bent to too high a degree and the furnace wall is close enough to the jet, the otherwise full extent to which the furnace gas could be entrained can be limited. If the furnace geometry does not limit the bent jet is such a manner, then generally speaking, the greater the degree to which the jet is bent, the greater it becomes diluted with furnace gases, the lower the overall furnace temperature becomes, and the greater the furnace temperature becomes homogenous. Also, for a jet which is not bent to too high a degree and whose furnace gas entrainment is not limited by the furnace geometry, increasing the burner power may result in the jet approaching too closely to the furnace wall. Consequently, it may result in reduced furnace gas entrainment. For a given furnace geometry, the skilled artisan will recognize that the jet bending may reach a point of limited returns. For an increase in a jet mass flow rate, the skilled artisan will similarly recognize that the bending angle may need to be decreased.

In addition to the furnace geometry, another factor limiting the degree to which the jet may be suitably bent is jet coherence. Beyond a certain point, attempts to bend to the jet to a greater degree will result in loss of coherence in the jet of second reactant. When jet coherence is deleteriously impacted, combustion might no longer be able to be sustained. Generally speaking, this jet coherence limiting factor leads to a maximum bend of up to about 40° from its normal axis.

At the conclusion of the transition from the heating phase of to the distributed combustion phase of, the desired degree of bending/diverting and desired degree of staging of the secondary portion is reached. These conditions are continued through the distributed combustion phase. During the distributed combustion phase, typically 90-95% of the overall amount of the reactant at issue is injected as the secondary portion (from the dynamical lance or secondary lance) while only 10-5% is injected as the primary portion (from the non-dynamical fuel-oxidant nozzle or dynamical fuel-oxidant nozzle, respectively). If desired, the degree of staging may be varied in an empirical manner to result in no visible flame (i.e., flameless combustion). Lower degrees of staging are also possible, depending upon the degree of distributed combustion desired. Additionally, lower degrees of staging may be desirable if a relatively shorter flame is necessary due to furnace geometry constraints.

The flowrate of the actuating fluid is typically 1-20% of the total flow from the dynamical fuel-oxidant nozzle or dynamical lance. Thus and in the case of a dynamical fuel-oxidant nozzle, the flow rate of the actuating fluid is typically 1-20% of the total flow of reactant injected through the centrally disposed nozzle and through the actuating fluid injection channels. In the case of a dynamical lance, the flow rate of the actuating fluid is typically 1-20% of the total flow of the secondary portion of reactant injected through the centrally disposed nozzle and through the actuating fluid injection channels. The velocity of the actuating fluid is typically 100 m/s or less at nominal burner power, while the fuel and primary oxidant velocities are typically 100-200 m/s and 75-150 m/s, respectively, at nominal burner power.

While the oxidant may be air, pure oxygen, oxygen-enriched air, or synthetic air comprising oxygen and recycled flue gas, typically it is oxygen having a purity of at least 90% (by volume). While the fuel may be any gaseous or liquid fuel, typically it is natural gas or fuel oil. The primary oxidant typically comprises 75-100% of the total oxidant flow rate of the burner during the heating phase, but only 0-10% of the total oxidant flowrate of the burner above the auto-ignition temperature (typically 0-10% of the total oxidant flowrate above 850° C.). On the other hand, the secondary oxidant typically has a velocity of 75-200 m/s at nominal burner power and comprises 0-25% of the total oxidant flowrate of the burner during the heating phase, but comprises as much as 90-100% at combustion chamber temperatures above the auto-ignition temperature (typically 90-100% of the total oxidant flowrate above 850° C.). Typically, the oxidant has a $O_2$ concentration (vol/vol) of no less than 90%.

While the secondary lance may be disposed at any location capable of achieving distributed combustion in combination with the dynamical fuel-oxidant nozzle, it is advantageously disposed above the dynamical fuel-oxidant nozzle for metal-melting processes where relatively low $O_2$ concentrations are desired for locations close to the molten bath. For metal-melting processes where a relatively high $O_2$ concentration is desired or tolerated at locations close to the molten bath, the secondary lance may be located below the dynamical fuel-oxidant nozzle. Also, for low-melting point metals such as lead, the flame may be bent towards the unmelted charge and moved away from the charge as it melts and towards other portions of unmelted charge. Regardless of the composition of the molten charge, for best results, a minimum distance between a center of the dynamical fuel-oxidant nozzle and a center of the secondary lance should be at least 10 times the inside diameter of the smaller of the centrally disposed nozzle of the secondary lance or of the centrally disposed nozzle in the dynamical fuel-oxidant nozzle. Similarly, the minimum distance between the center of the secondary lances should be at least 10 times the inside diameter of the centrally disposed nozzles of those lances. Also, the minimum distance between the center of the non-dynamical fuel-oxidant nozzle and the center of the dynamical lance should be at least 10 times the inside diameter of the smaller of the centrally disposed nozzle of the dynamical lance or of the centrally disposed nozzle of the non-dynamical fuel-oxidant nozzle.

One of the major benefits of the disclosed burner and distributed combustion process is its adaptability to different burner powers. Take the case of a distributed combustion burner having spatially separated reactant injections whose reactant injection angles are fixed with respect to one another. Such burner designs are driven by the need for achieving distributed combustion at a typical burner power. When the power of such a burner is decreased from the optimized power, the relatively lower pressure injections of reactants along fixed angles (or parallel to one another) will tend to increase mixing of the reactants with furnace gases before mixing with one another, thereby leading to an unstable flame. When the power of such a burner is increased from the optimized power, the relatively higher pressure injections along fixed angles (or parallel to one another) will tend to mix less with furnace gases before the reactants mix together, thereby leading to hot spots in the flame and furnace, the lack of distributed combustion, and the presence of a visible flame. On the other hand, since the injection angle of one of the reactants can be varied in the inventive burner, the burner can achieve consistent distributed combustion performance over a range of burner powers, thus providing the operator with a much larger turn-down ratio. Moreover, the variable injection angle of the reactant also allows the burner to vary the $O_2$/CO concentration above the melt for different products. For example Aluminum furnaces require lower $O_2$ concentration in the combustion gases above the metal bath. In such furnaces, the inventive burner can inject the oxidant at an angle away from the bath to decrease the $O_2$ concentration above the metal bath. As another example, lead furnaces are relatively lower temperature furnaces whose molten charge can withstand more of an oxidizing atmosphere. In such furnaces, the inventive burner can inject the oxidant at an angle towards the bath to increase convective heat transfer to the metal bath.

Several embodiments of the inventive process will now be described.

As best illustrated in FIGS. 3A-3C, during a heating phase, a non-divertable jet NDJ of both reactants (either oxidant annularly shrouding a fuel or a fuel annularly shrouding an oxidant) is injected from the burner block B by a fuel-oxidant nozzle. The skilled artisan will recognize that the non-divertable jet NDJ is not able to be bent/diverted. This is because the fuel-oxidant nozzle does not provide for jets of actuating fluid. Hence, the reactants are injected from the fuel-oxidant nozzle along an axis extending straight out from the fuel-oxidant nozzle. Once a desired minimum temperature is reached within the combustion space in the furnace (such as the auto-ignition temperature of the fuel and oxidant), a transition is begun from the heating phase to the distributed combustion phase.

At a beginning of this transition, a relatively small amount of only one of the reactants (either oxidant or fuel alone) is injected from the burner block B by a dynamical lance as a divertable jet DJ. The non-divertable jet NDJ and the divertable jet DJ intersect at a point I. At the same time, the amount of that same type of reactant being injected by the fuel-oxidant nozzle is decreased by a corresponding amount. For purposes of clarity, the single reactant injected by the dynamical lance is termed the secondary portion of that reactant while the same type of reactant that is injected by the fuel-oxidant nozzle is termed the primary portion of that reactant. For example, if the sole reactant at issue is oxidant, the dynamical lance will inject the secondary oxidant while the non-dynamical fuel-oxidant nozzle will inject the primary oxidant.

With continuing reference to FIGS. 3A-3C and at the beginning of this transition, a single reactant may be injected by the dynamical lance in one of two ways. In the first option, all of the single reactant is injected by the dynamical lance from a centrally disposed nozzle. Since none of the single reactant is injected as an actuating jet, the divertable jet DJ is not diverted but is instead injected along an axis $A_1$ that extends directly outward from the centrally disposed nozzle. Alternatively and in a second option, the large majority of the that single reactant from the dynamical lance is injected from the centrally-disposed nozzle while a minority of that reactant injected by the dynamical lance is injected in the form of one or more actuating jets surrounding the centrally-disposed nozzle. Since some of the single reactant is injected as an actuating jet, the divertable jet DJ is diverted from the axis $A_1$ by an angle.

As the transition from the heating phase to the distributed combustion phase continues, a relatively greater proportion of that type of reactant is injected as the secondary portion while a relatively lesser proportion of the single reactant is injected as the primary portion. Additionally, and depending upon whether the first or second option described above is selected, either injection of the actuating jet of the single reactant is begun or it is increased. Thus, either diversion of the divertable jet DJ at an angle from the axis A1 begins or the angle at which the divertable jet DJ is being diverted is increased. As discussed above, the skilled artisan will recognize that the degree of diversion of the divertable jet DJ is partially a function of the amount of the single reactant injected as one or more actuating jets.

With continuing reference to FIGS. 3A-3C and at the conclusion of the transition from the heating phase to the distributed combustion phase, the desired proportion of the single reactant injected as the secondary portion as opposed to the primary portion is reached (i.e., the desired degree of staging is reached). Also, the desired degree of bending of the divertable jet DJ is reached. Depending upon the furnace geometry, burner power, and degree of staging, the distributed combustion may in fact be flameless combustion. Distributed combustion is carried in this manner until such time as the burner power needs to be increased or decreased or the burner needs to be shut down. If the burner power needs to be increased, it may be advantageous to increase the degree of bending of the divertable jet DJ for purposes of achieving a satisfactory degree of furnace gas entrainment. If an increase in the burner power causes the divertable jet DJ to be diverted/bent too close to a furnace wall and reduce furnace gas entrainment. In this case, the angle to which the divertable jet DJ is diverted/bent may be decreased to allow a satisfactory degree of furnace gas entrainment. If the burner power needs to be decreased, it may be advantageous to decrease the degree of bending of the divertable jet DJ for purposes of achieving a stable flame.

Figure 3E:
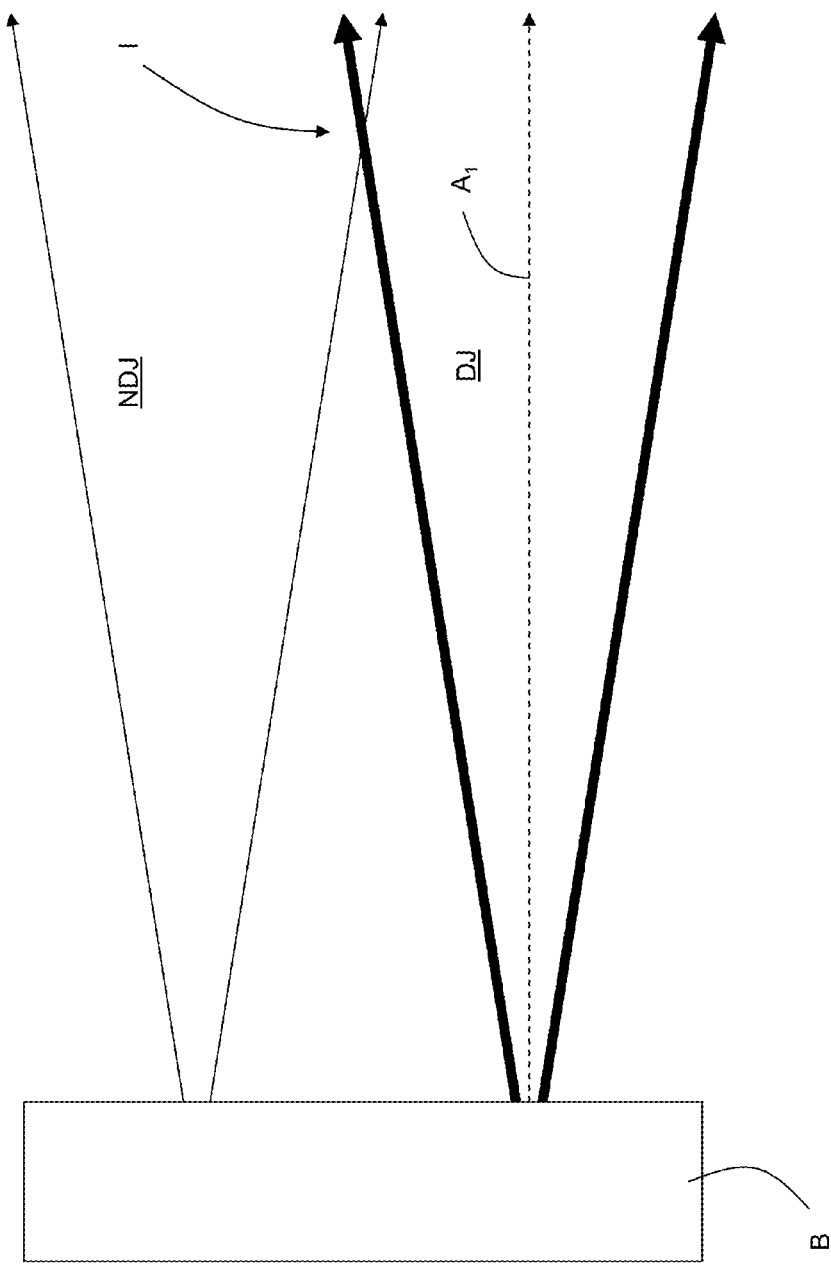
FIG. 3E is a schematic of the process of FIG. 3D during a transition from the heating phase to a distributed combustion phase where the divertable jet is injected by a dynamical fuel-oxidant nozzle and the non-divertable jet is injected by a secondary lance.
Figure 3F:
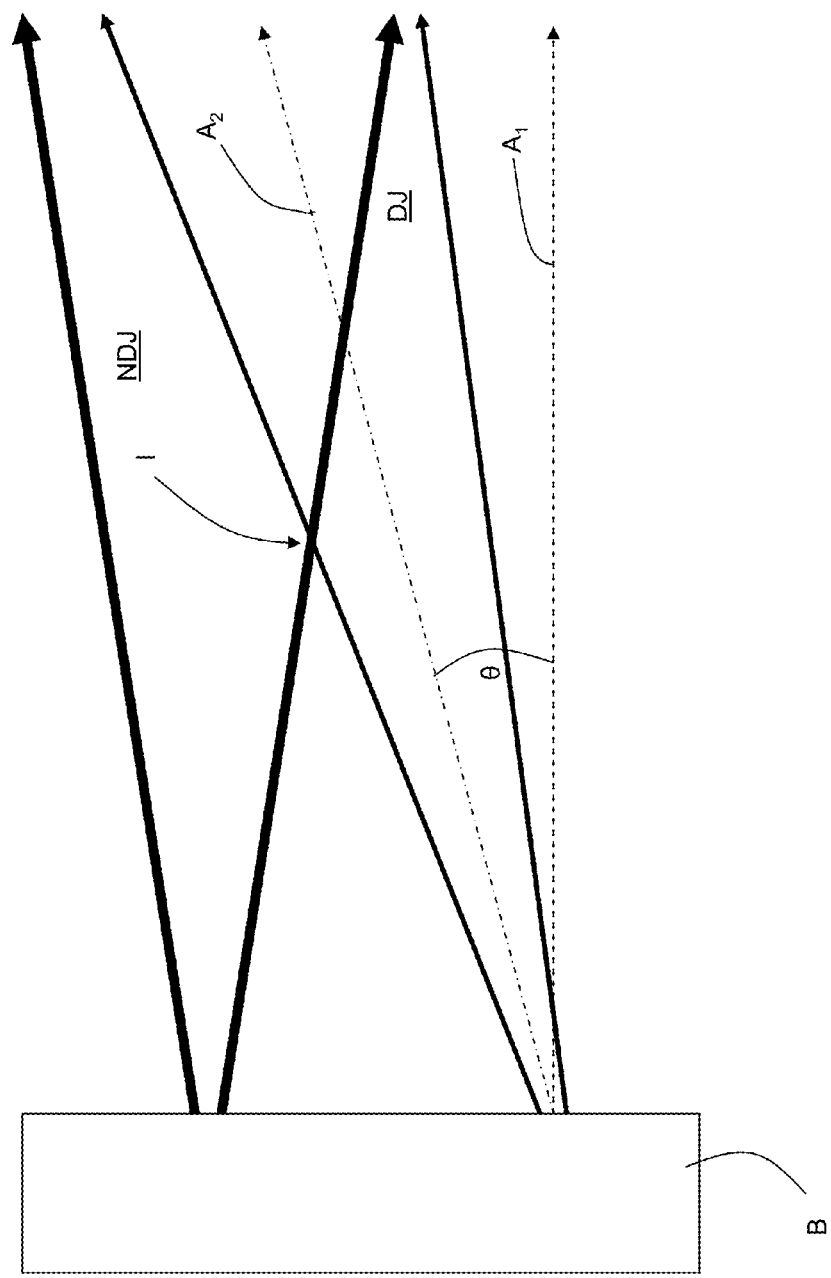
FIG. 3F is a schematic of the process of FIGS. 3D-E during the distributed combustion phase where the divertable jet is injected by a dynamical fuel-oxidant nozzle and the non-divertable jet is injected by a secondary lance.

In another embodiment and as best shown in FIGS. 3D-3F, during a heating phase, a divertable jet DJ of both reactants (either oxidant annularly shrouding a fuel or a fuel annularly shrouding an oxidant) is injected from the burner block B by a dynamical fuel-oxidant nozzle along an axis $A_1$. The reactant which is injected annularly is termed the primary portion of that reactant. Once a desired minimum temperature is reached within the combustion space in the furnace (such as the auto-ignition temperature of the fuel and oxidant), a transition is begun from the heating phase to the distributed combustion phase.

At a beginning of this transition, injection of a relatively small amount of the same type of reactant (either oxidant or fuel alone) injected annularly by the dynamical fuel-oxidant nozzle is now injected from the burner block B by a secondary lance as a non-divertable jet NDJ. This portion of injected reactant is termed the secondary portion. Together, the primary and secondary portions of that reactant make up the total amount of that reactant participating in the combustion reaction. The skilled artisan will recognize that the non-divertable jet NDJ is not able to be bent/diverted. This is because the secondary lance does not provide for actuating jets of reactant. Hence, the non-divertable jet NDJ constituting the secondary portion is injected from the secondary lance along an axis extending straight out from the secondary lance. Together, the primary and secondary portions of that reactant make up the total amount of that reactant participating in the combustion reaction. The non-divertable jet NDJ and the divertable jet DJ intersect at a point I. At the same time, the amount of the primary portion injected by the dynamical fuel-oxidant nozzle is decreased by a corresponding amount. For example, if the reactant injected annularly by the dynamical fuel-oxidant nozzle is oxidant, the secondary lance will inject the secondary oxidant while the dynamical fuel-oxidant nozzle will inject the primary oxidant.

With continuing reference to FIGS. 3D-3F and at the beginning of this transition, injection of the type of reactant injected by the dynamical fuel-oxidant nozzle through the centrally disposed nozzle may be performed in one of two ways. In the first option, all of that reactant is injected by the dynamical fuel-oxidant nozzle through the centrally disposed nozzle. Since none of that reactant is injected as an actuating jet, the divertable jet DJ from the dynamical fuel-oxidant nozzle is not diverted but is instead injected along an axis $A_1$ that extends directly outward from the centrally disposed nozzle. For example, if the fuel is injected by the dynamical fuel-oxidant nozzle through the centrally disposed nozzle and the primary oxidant is injected by the dynamical fuel-oxidant nozzle in an annular shroud around the fuel, no fuel is initially injected through any of the actuating jets. Alternatively and in a second option, the large majority of the type of reactant that is injected from the centrally disposed nozzle of the dynamical fuel-oxidant nozzle is injected from the centrally-disposed nozzle while a minority of that type of reactant is injected in the form of one or more actuating jets surrounding the annularly injected primary portion of the other reactant. Since some of the single reactant is injected as an actuating jet, the divertable jet DJ is diverted from the axis $A_1$ by an angle. For example, if the fuel is injected by the dynamical fuel-oxidant nozzle through the centrally disposed nozzle and the primary oxidant is injected by the dynamical fuel-oxidant nozzle in an annular shroud around the fuel, a minor amount of the fuel is injected in the form of one or more actuating jets surrounding the annular injection of primary oxidant and a major amount of the fuel is injected through the centrally disposed nozzle.

With continuing reference to FIGS. 3D-3F and as the transition from the heating phase to the distributed combustion phase continues, a relatively greater proportion of the secondary portion is injected by the secondary lance while a relatively lesser proportion of the primary portion of that same type of reactant is annularly injected as the primary portion by the dynamical fuel-oxidant nozzle. Additionally, and depending upon whether the first or second option described above is selected, either injection of the actuating jet of reactant is begun or it is increased. Thus, either diversion of the divertable jet DJ at an angle from the axis $A_1$ begins or the angle at which the divertable jet DJ is being diverted is increased. As discussed above, the skilled artisan will recognize that the degree of diversion of the divertable jet DJ is partially a function of the amount of the single reactant injected as one or more actuating jets.

At the conclusion of the transition from the heating phase to the distributed combustion phase, the desired proportion of the reactant injected as the secondary portion as opposed to the primary portion is reached (i.e., the desired degree of staging is reached). Also, the desired degree of bending of the divertable jet DJ is reached and the divertable jet DJ is injected along an axis $A_2$. The angle by which the divertable jet DJ is bent is described by an angle θ formed by axes $A_1, A_2$. Depending upon the furnace geometry, burner power, and degree of staging, the distributed combustion may in fact be flameless combustion. Distributed combustion is carried in this manner until such time as the burner power needs to be increased or decreased or the burner needs to be shut down. If the burner power needs to be increased, it may be advantageous to increase the degree of bending of the divertable jet DJ for purposes of achieving a satisfactory degree of furnace gas entrainment. If an increase in the burner power causes the divertable jet DJ to be diverted/bent too close to a furnace wall and reduce furnace gas entrainment. In this case, the angle to which the divertable jet DJ is diverted/bent may be decreased to allow a satisfactory degree of furnace gas entrainment. If the burner power needs to be decreased, it may be advantageous to decrease the degree of bending of the divertable jet DJ for purposes of achieving a stable flame.

Figure 3H:
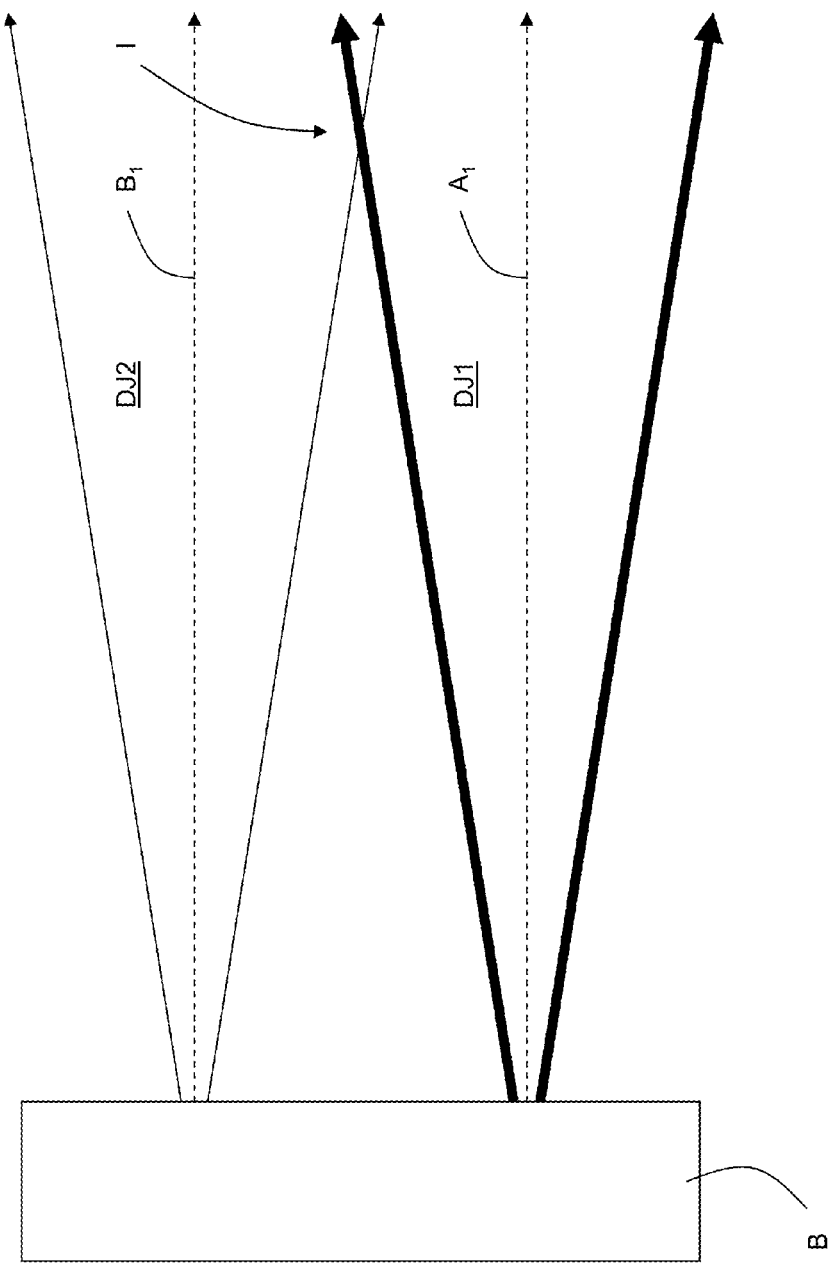
FIG. 3H is a schematic of the process of FIG. 3G during a transition from the heating phase to a distributed combustion phase where the divertable jet is injected by a dynamical fuel-oxidant nozzle and another divertable jet is injected by a dynamical lance.
Figure 3I:
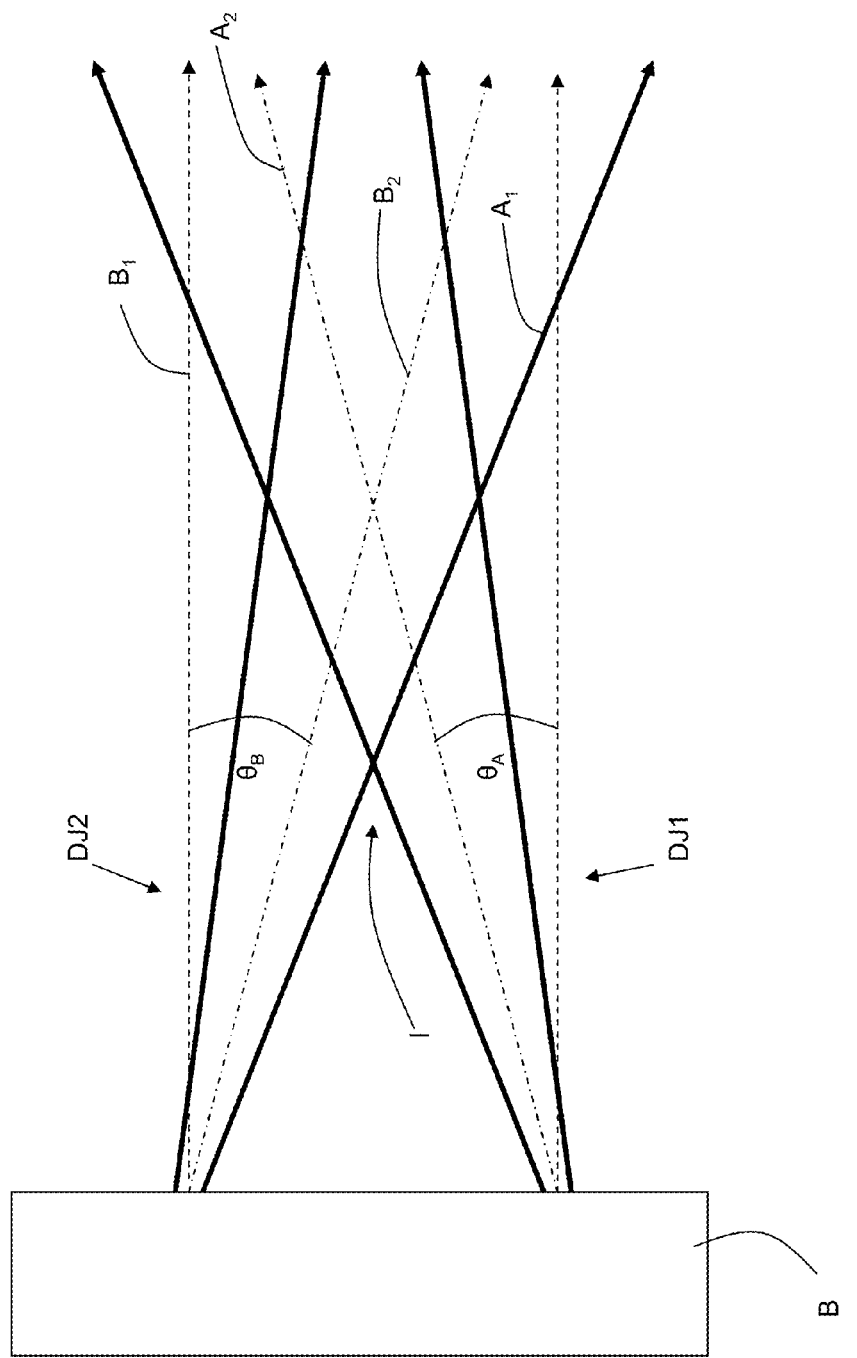
FIG. 3I is a schematic of the process of FIGS. 3G-H during the distributed combustion phase where the divertable jet is injected by a dynamical fuel-oxidant nozzle and another divertable jet is injected by a dynamical lance.

In another embodiment and as best shown in FIGS. 3G-3I, during a heating phase, a first divertable jet DJ1 of both reactants (either oxidant annularly shrouding a fuel or a fuel annularly shrouding an oxidant) is injected from the burner block B by a dynamical fuel-oxidant nozzle along axis $A_1$. The reactant which is injected annularly is termed the primary portion of that reactant. Once a desired minimum temperature is reached within the combustion space in the furnace (such as the auto-ignition temperature of the fuel and oxidant), a transition is begun from the heating phase to the distributed combustion phase.

At a beginning of this transition, injection of a relatively small amount of the same type of reactant (either oxidant or fuel alone) injected annularly by the dynamical fuel-oxidant nozzle is now injected from the burner block B by a dynamical lance as a second divertable jet DJ2. This portion of injected reactant is termed the secondary portion. Together, the primary and secondary portions of that reactant make up the total amount of that reactant participating in the combustion reaction. The second divertable jet DJ2 constituting the secondary portion is injected from the dynamical lance. Together, the primary and secondary portions of that reactant make up the total amount of that reactant participating in the combustion reaction. The divertable jets DJ1, DJ2 intersect at a point I. At the same time, the amount of the primary portion injected by the dynamical fuel-oxidant nozzle is decreased by a corresponding amount. For example, if the reactant injected annularly by the dynamical fuel-oxidant nozzle is oxidant, the dynamical lance will inject the secondary oxidant while the dynamical fuel-oxidant nozzle will inject the primary oxidant.

With continuing reference to FIGS. 3D-3F and at the beginning of this transition, injection by the burner B of the type of reactant that is injected from the centrally disposed nozzle of the dynamical fuel-oxidant nozzle may be achieved in one of two optional ways. In the first way, all of that reactant injected by the dynamical fuel-oxidant nozzle is injected only through the centrally disposed nozzle. Since none of that reactant is injected as an actuating jet, the first divertable jet DJ from the dynamical fuel-oxidant nozzle is not diverted but is instead injected along an axis $A_1$ that extends directly outward from the centrally disposed nozzle. For example, if the fuel is injected by the dynamical fuel-oxidant nozzle through the centrally disposed nozzle and the primary oxidant is injected by the dynamical fuel-oxidant nozzle in an annular shroud around the fuel, no fuel is initially injected through any of the actuating jets. Alternatively and in the second way, the large majority of the type of reactant that is injected from the centrally disposed nozzle of the dynamical fuel-oxidant nozzle is injected from the centrally-disposed nozzle while a minority of that type of reactant is injected in the form of one or more actuating jets surrounding the annularly injected primary portion of the other reactant. Since some of the single reactant is injected as an actuating jet, the first divertable jet DJ1 is diverted from the axis $A_1$ by an angle. For example, if the fuel is injected by the dynamical fuel-oxidant nozzle through the centrally disposed nozzle and the primary oxidant is injected by the dynamical fuel-oxidant nozzle in an annular shroud around the fuel, a minor amount of the fuel is injected in the form of one or more actuating jets surrounding the annular injection of primary oxidant and a major amount of the fuel is injected through the centrally disposed nozzle.

Similarly, injection of the type of reactant injected by the dynamical lance may be performed in one of two optional ways. In the first way, all of that reactant injected by the dynamical lance is injected from a centrally disposed nozzle. Since none of that reactant by the dynamical lance is injected as an actuating jet, the second divertable jet DJ2 is not diverted but is instead injected along an axis $B_1$ that extends directly outward from the centrally disposed nozzle. Alternatively and in the second way, the large majority of that single reactant injected by the dynamical lance is injected from the centrally-disposed nozzle while a minority of that reactant injected in the form of one or more actuating jets surrounding the centrally-disposed nozzle of the dynamical lance. Since some of the single reactant is injected as an actuating jet, the second divertable jet DJ2 is diverted from the axis $A_1$ by an angle.

With continuing reference to FIGS. 3D-3F and as the transition from the heating phase to the distributed combustion phase continues, a relatively greater proportion of the secondary portion is injected by the dynamical lance while a relatively lesser proportion of the primary portion of that same type of reactant is annularly injected as the primary portion by the dynamical fuel-oxidant nozzle. Additionally, and depending upon whether the first or second way described above is selected, either injection of the actuating jet of reactant is begun or it is increased. Thus, either diversion of the second divertable jet DJ2 at an angle from the axis $A_1$ begins or the angle at which the second divertable jet DJs is being diverted is increased. As discussed above, the skilled artisan will recognize that the degree of diversion of the divertable jet DJ is partially a function of the amount of the single reactant injected as one or more actuating jets.

At the conclusion of the transition from the heating phase to the distributed combustion phase, the desired proportion of the reactant injected as the secondary portion as opposed to the primary portion is reached (i.e., the desired degree of staging is reached). Also, the desired degree of bending of each of the divertable jets DJ1, DJ2 is reached so that they are diverted by angles $\theta_A$, $\theta_B$, respectively, formed by initial injection axes $A_1$, $B_1$ and final injection axes $A_2$, $B_2$, respectively. Depending upon the furnace geometry, burner power, and degree of staging, the distributed combustion may in fact be flameless combustion. Distributed combustion is carried in this manner until such time as the burner power needs to be increased or decreased or the burner needs to be shut down. If the burner power needs to be increased, it may be advantageous to increase the degree of bending of the first and/or the second divertable jets DJ1, DJ2 for purposes of achieving a satisfactory degree of furnace gas entrainment. If an increase in the burner power causes the first and/or second divertable jets DJ1, DJ2 to be diverted/bent too close to a furnace wall and reduce furnace gas entrainment. In this case, the angles $\theta_A$, $\theta_B$ to which the first and second divertable jets DJ1, DJ2 are respectively diverted/bent may be decreased to allow a satisfactory degree of furnace gas entrainment. If the burner power needs to be decreased, it may be advantageous to decrease one or both of the angles $\theta_A$, $\theta_B$ or purposes of achieving a stable flame.

Figure 3J:
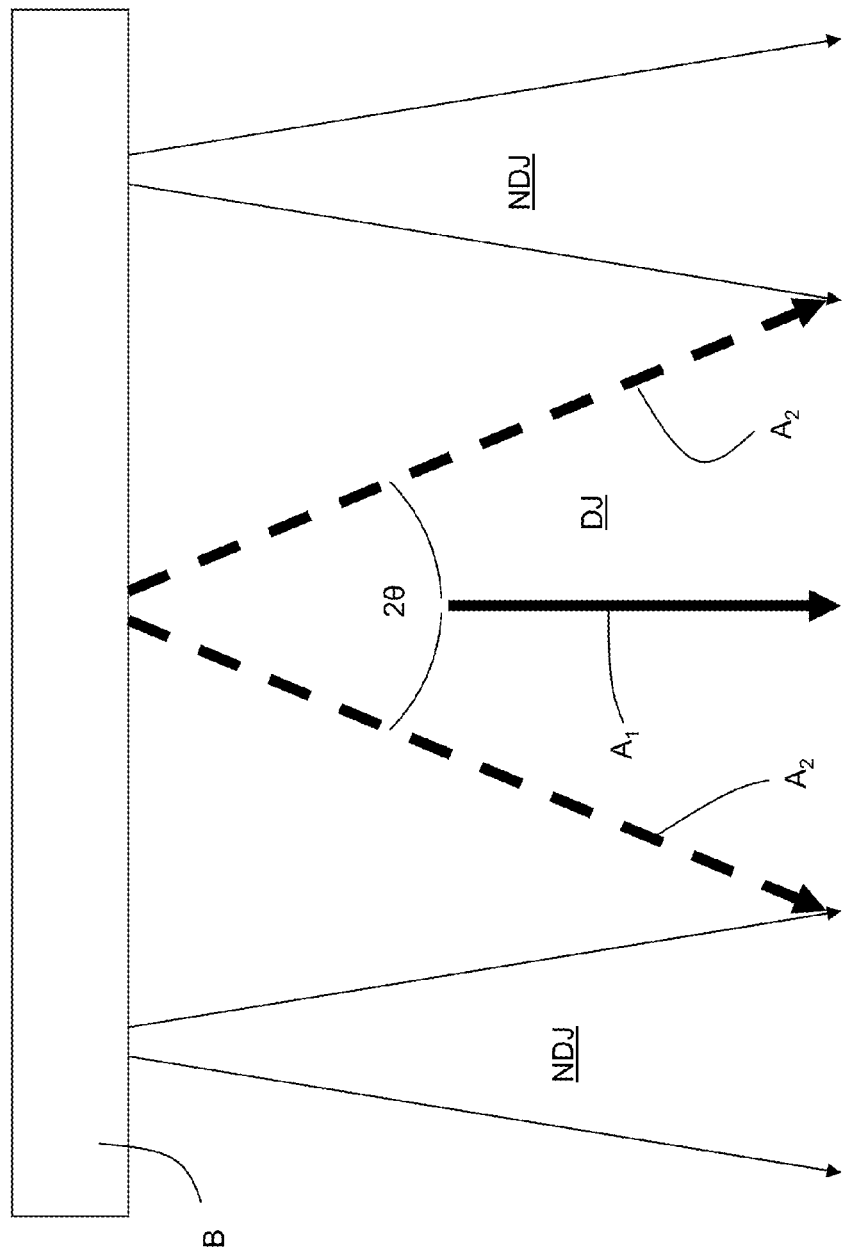
FIG. 3J is a schematic top plan of an optional sweeping technique.
Figure 4A:
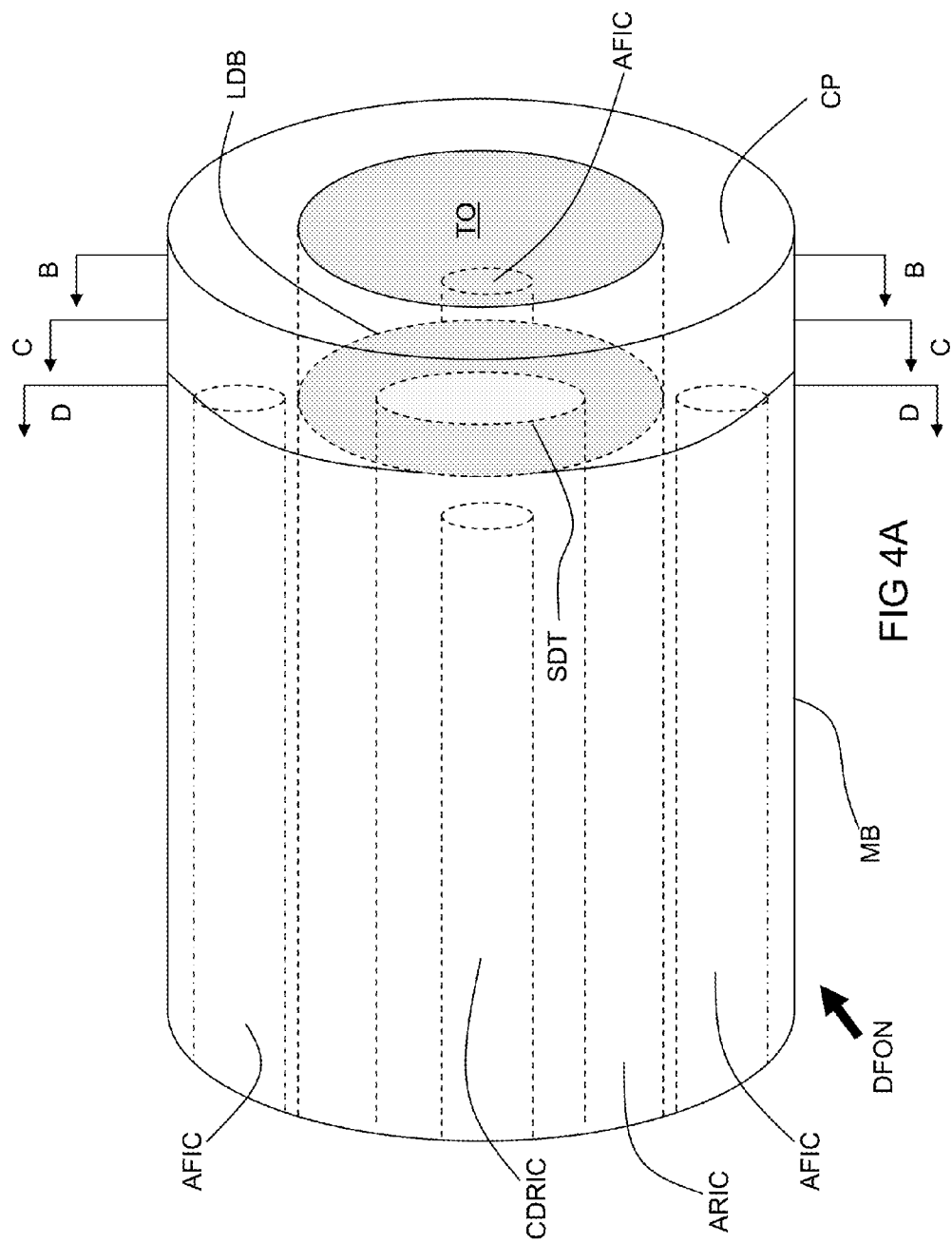
FIG. 4A is a schematic isometric view of a first embodiment of a fuel/oxidant nozzle of the disclosed burner.
Figure 4C:
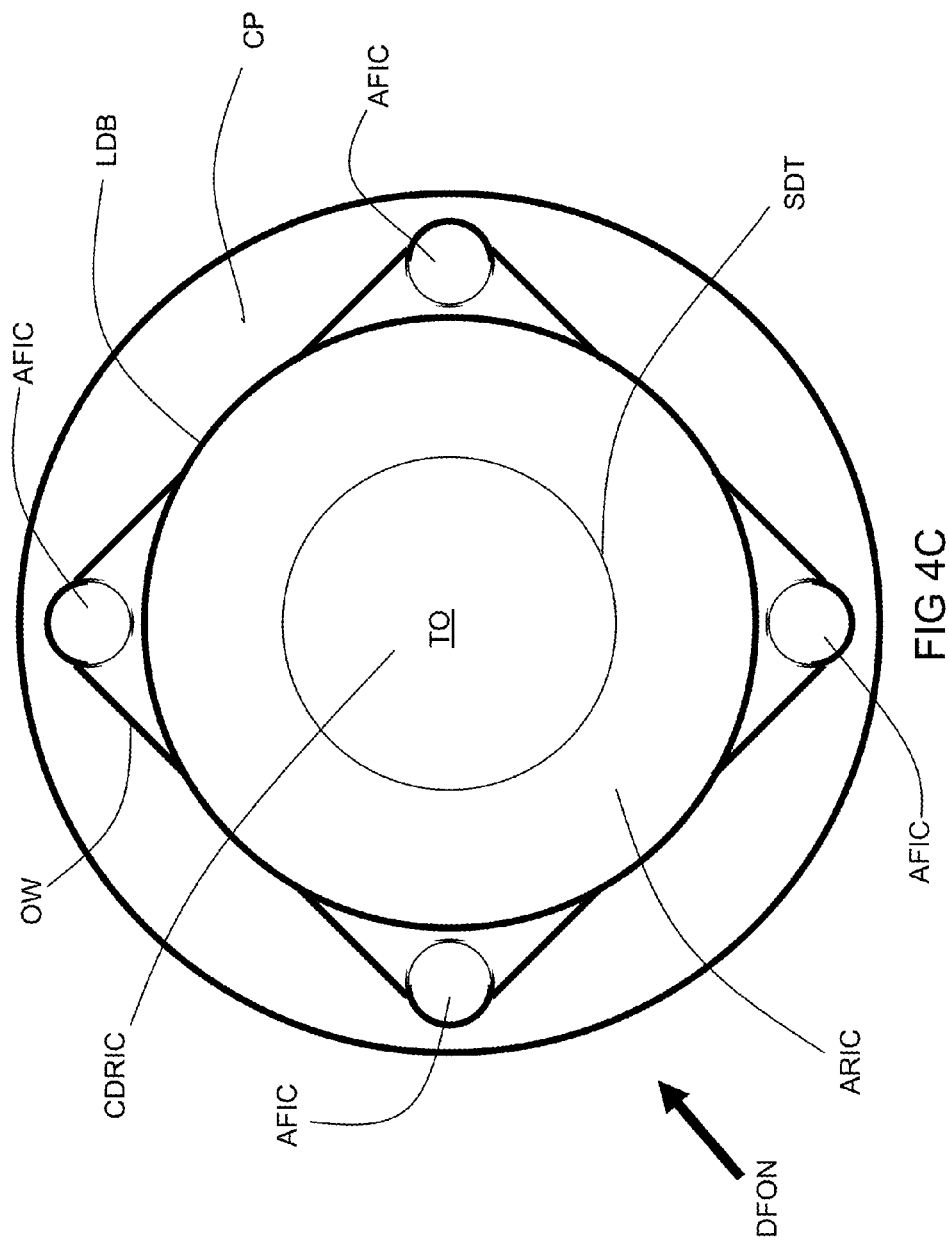
FIG. 4C is a cross-sectional view of the nozzle of FIG. 4A taken along line C-C illustrating hidden parts.

As best illustrated by FIG. 3J, a divertable jet DJ is injected from a burner block B between two non-divertable jets NDJ. The divertable jet DJ may be injected in between the two non-divertable jets NDJ in the same plane from which the two non-divertable jets NDJ are injected. In this first case, during the distributed combustion phase the divertable jet DJ is swept between the two non-divertable jets NDJ. This is achieved by alternatingly injecting actuating jets of reactant on either side of the divertable jet DJ to bend/diver the divertable jet DJ towards the two non-divertable jets NDJ in an alternating fashion. Thus, at any one moment, one of the non-divertable jets NDJ does not intersect the divertable jet DJ while the other of the non-divertable jets NDJ does intersect the divertable jet DJ. Alternatively, in a second case the divertable jet DJ may be injected in between the two non-divertable jets NDJ above or below the plane from which the two non-divertable jets NDJ are injected. In this second case, during the distributed combustion phase, the divertable jet DJ is already bent/diverted towards the plane from which the non-divertable jets NDJ are injected. This of course is achieved through injection of reactant through an actuating jet on a side of the jet opposite the direction of the bending/diversion. For example, if the divertable jet DJ is injected from the burner block B above the plane from which the two non-divertable jets NDJ are injected, the actuating jet is injected from above the centrally disposed nozzle (or annular shroud of one reactant injected around another reactant injected from a centrally disposed nozzle) from which the divertable jet DJ is injected. Additionally, actuating jets on opposite sets of the divertable jet DJ are alternatingly injected towards the divertable jet DJ in order to bend/divert the divertable jet DJ towards or away from one or the other of the two non-divertable jets NDJ in alternating fashion. Thus, at any one moment, one of the non-divertable jets NDJ does not intersect the divertable jet DJ while the other of the non-divertable jets NDJ does intersect the divertable jet DJ. Regardless of whether the first case or second case is opted, generally speaking it is desirable to have a higher frequency of the sweeping motion if possible. Since the frequency of the sweeping is limited by the ability of valves to open and close and thus inject an actuating jet on one side of the divertable jet DJ or on the other side of the divertable jet DJ, conventional valves typically yield a maximum frequency of about 1 Hz.

Several embodiments of the inventive burner will now be described.

As best illustrated in FIGS. 1, 2A-2C, 4A-4E, 5A-5D, 6A-6B, and 7A-7B, several different types of burners, nozzles and lances may be used to implement the inventive methods and inject reactants $R_1$ and $R_2$. In one case, $R_1$ is the fuel and $R_2$ is the oxidant. In another case, $R_1$ is instead the oxidant and $R_2$ is the fuel.

As best shown in FIG. 1, a first embodiment of the inventive burner includes a burner block B, a dynamical lance DL, and a non-dynamical fuel/oxidant nozzle FON. The burner block B is typically made of a refractory non-metallic material, a refractory metal, or a metal such as copper or stainless steel. The burner block B may be water-cooled if desired. The non-dynamical fuel-oxidant nozzle FON injects a primary portion of reactant $R_1$ from a centrally disposed nozzle and a primary portion of reactant $R_2$ from an annular space in between the centrally disposed nozzle and a bore in the burner block B concentrically disposed around such nozzle or in between the centrally disposed nozzle and a second nozzle concentrically disposed around such nozzle, in which case the second nozzle is inserted into the bore in the burner block B. The dynamical lance DL injects a secondary portion of reactant $R_2$ from a centrally disposed nozzle and actuating portions of reactant $R_2$ from actuating fluid injection channels spaced axially outwardly from the centrally disposed nozzle of the dynamical lance DL. The smaller circles schematically depict the hidden actuating portion of reactant $R_2$ by way of broken lines. This is because typically the jet of the actuating portion of reactant $R_2$ out of the actuating fluid injection channel intersects, at an angle, the jet of the secondary portion of reactant $R_2$ exiting the centrally disposed nozzle at a point before the jet of reactant $R_2$ (injected from the centrally disposed nozzle) exits the dynamical lance DL. Alternatively, the jet of the actuating portion of reactant $R_2$ may exit out the terminal face (the terminal face faces the combustion chamber) of the dynamical lance DL and intersect with the jet of the secondary portion of reactant $R_2$ after such jet has completely exited the dynamical lance DL. The skilled artisan will recognize that the burner of the first embodiment may be placed in orientations other than that illustrated by FIG. 1. It may be rotated right or left, such as 90 degrees or rotated 180 degrees.

As best illustrated in FIG. 2A, a second embodiment of the inventive burner includes a burner block B, a secondary lance SL, and a dynamical fuel/oxidant nozzle DFON. The burner block B is typically made of a refractory non-metallic material, a refractory metal, or a metal such as copper or stainless steel. The burner block B may be water-cooled if desired. The secondary lance SL includes a nozzle for injecting a secondary portion of $R_2$ as a jet into the furnace. The secondary lance SL is not dynamical. The dynamical fuel-oxidant nozzle DFON injects a primary portion of reactant $R_1$ from a centrally disposed nozzle and a primary portion of reactant $R_2$ from an annular space in between the centrally disposed nozzle and a bore in the burner block B concentrically disposed around such nozzle or in between the centrally disposed nozzle and a second nozzle concentrically disposed around such nozzle, in which case the second nozzle is inserted with a bore in the burner block B. The dynamical fuel-oxidant nozzle DFON also injects actuating portions of reactant $R_1$ from actuating fluid injection channels spaced axially outwardly from the centrally disposed nozzle of the dynamical fuel-oxidant nozzle DFON. The smaller circles schematically depict the hidden actuating portion of reactant $R_1$ by way of broken lines. This is because typically the jet of the actuating portion of reactant $R_1$ out of the actuating fluid injection channel intersects, at an angle, the jet of reactant $R_1$ annularly-enshrouded by reactant $R_2$ exiting the centrally disposed nozzle at a point before the $R_1/R_2$ jet (injected from the centrally disposed nozzle) exits the dynamical fuel-oxidant nozzle DFON. Alternatively, the jet of the actuating portion of reactant $R_1$ may exit out the terminal face (the terminal face faces the combustion chamber) of the dynamical fuel-oxidant nozzle DFON and intersect with the $R_1/R_2$ jet after such jet has completely exited the dynamical fuel-oxidant nozzle DFON. The skilled artisan will recognize that the burner of the second embodiment may be placed in orientations other than that illustrated by FIG. 2A. It may be rotated right or left, such as by 90 degrees or rotated 180 degrees.

It is also within the scope of the invention to substitute the secondary lance SL of FIG. 2A with the dynamical lance DL of FIG. 1. In such a modified burner, each of the jets injected by the dynamical lance DL and the dynamical fuel-oxidant nozzle DFON may be diverted through actuating jets of reactant $R_2$ and reactant $R_1$, respectively. At any moment in time, one or both of the jets may be diverted.

In FIG. 2B, the inside diameter $D_1$ of the centrally disposed nozzle of the secondary lance SL is smaller than the inside diameter $D_2$ of the centrally disposed nozzle of the dynamical fuel-oxidant nozzle DFON. The center of the dynamical fuel-oxidant nozzle DFON may be separated from the center of the secondary lance SL by a distance x which is at least 10 times the inside diameter $D_1$. Alternatively, if $D_1$ is larger than $D_2$, x may be at least 10 times $D_2$.

As best shown in FIG. 2C, a third embodiment of the inventive burner is the same as the second embodiment illustrated by FIGS. 2A-B, except that it includes two secondary lances SL. The secondary lances SL are equally spaced to opposite sides of the dynamical fuel-oxidant nozzle DFON. If the inside diameter $D_1$ of the centrally disposed nozzles of the secondary lances SL is smaller than the inside diameter $D_2$ of the centrally disposed nozzle of the fuel-oxidant nozzle DFON, then each of the centers of the secondary lances SL is separated from the center of the dynamical fuel-oxidant nozzle DFON by a vertical distance x which is at least 10 times $D_1$. If $D_1$ is larger than $D_2$, x is at least 10 times $D_2$. The centers of the secondary lances SL should also be separated by a horizontal distance y which is at least 10 times the smaller of $D_1$ and $D_2$. The skilled artisan will recognize that the burner of the third embodiment may be placed in orientations other than that illustrated by FIG. 2C. It may be rotated right or left, such as by 90 degrees or rotated 180 degrees.

It is also within the scope of the invention to substitute the secondary lances SL of FIG. 2C with the dynamical lance DL of FIG. 1. In such a modified burner, each of the jets injected by the dynamical lances DL and the dynamical fuel-oxidant nozzle DFON may be diverted through actuating jets of reactant $R_2$ and reactant $R_1$, respectively. At any moment in time, one or both of the jets may be diverted.

One type of dynamical lance DL suitable for use in the inventive methods and burners is shown in FIGS. 5A-5E. The dynamical lance DL includes a main nozzle body MB and a cap CP. A centrally disposed reactant injection channel CDRIC and a plurality of actuating fluid injection channels AFIC extend through the main nozzle body MB. A cap CP covers the end of the main nozzle body MB that faces the combustion chamber. Reactant $R_2$ flows through and is injected from a centrally disposed reactant injection channel CDRIC extending through the main body. When the dynamical lance DL is being used to divert a jet of reactant injected therefrom, reactant $R_2$ also flows through four actuating fluid injection channels AFIC. The actuating fluid injection channels AFIC are equally spaced at a same radial distance from the centrally disposed reactant injection channel CDRIC and extend through the main nozzle body MB. Optionally, there may be as few as three, two or only one actuating fluid injection channels AFIC or as many as eight in the main nozzle body MB. In any case, the actuating fluid injection channels AFIC are typically equally radially spaced around the centrally disposed reactant injection channel CDRIC. The actuating fluid injection channels AFIC are illustrated with broken lines in FIGS. 5A-B as they are not visible from the front of the dynamical lance DL.

The terminus (facing the combustion chamber) of the main nozzle body MB is covered with and joined to a cap CP. The cap CP has a terminal opening TO oriented along the axis of the centrally disposed reactant injection channel CDRIC. The terminal opening TO is generally sized to match a diameter of the centrally disposed reactant injection channel CDRIC so that the flow of reactant $R_2$ therethrough continues through the terminal opening TO and out the dynamical lance DL. The cap CP includes a cavity on the side facing the terminus of the main body MB.

The cavity extends in the axial direction of the cap CP (upstream to downstream) to terminate at a flat surface lying in a plane perpendicular to the axis of the dynamical lance DL. While the outer walls OW in FIGS. 5B, 5C, and 5E illustrate a cavity as having a generally square-shaped perimeter with each of the corners extending to a point adjacent the actuating fluid injection channels AFIC, the cavity can have any shape so long as it extends between the terminal opening TO and the actuating fluid injection channels AFIC to provide fluid communication therebetween. Indeed, the cavity may comprise four cavities, each one of which separately communicates between the terminal opening TO and a respective one of the actuating fluid injection channels AFIC.

With continuing reference to FIGS. 5A-5E, reactant $R_2$ flows out the terminal end of the centrally disposed reactant injection channel CDRIC and out the terminal opening TO in the cap CP. As the flow of actuating reactant $R_2$ exits the actuating fluid injection channel, the flat surface of the cavity redirects the direction of the flow of actuating reactant $R_2$ so that it intersects the flow of reactant $R_2$ being injected from the centrally disposed reactant injection channel CDRIC at about a right angle. Because the jet of actuating reactant $R_2$ intersects the jet of the reactant $R_2$ from the centrally disposed reactant injection channel CDRIC, the central jet of reactant $R_2$ is caused to be bent/diverted in a direction away from the jet of actuating reactant $R_2$. The direction bending/diversion may be controlled by supplying reactant $R_2$ to the appropriate actuating fluid injection channel AFIC. The angle of bending/diversion may be controlled by controlling the pressure of the actuating reactant $R_2$. For example, the diverted jet DJ of reactant may be bent/diverted downwardly by injecting actuating fluid through an actuating fluid injection channel AFIC positioned above the centrally disposed reactant injection channel CDRIC. If the jet DJ is to instead be bent to the right-hand side of the burner, the actuating fluid is instead injected from an actuating fluid injection channel AFIC located to the left of the centrally disposed reactant injection channel CDRIC.

Figure 7B:
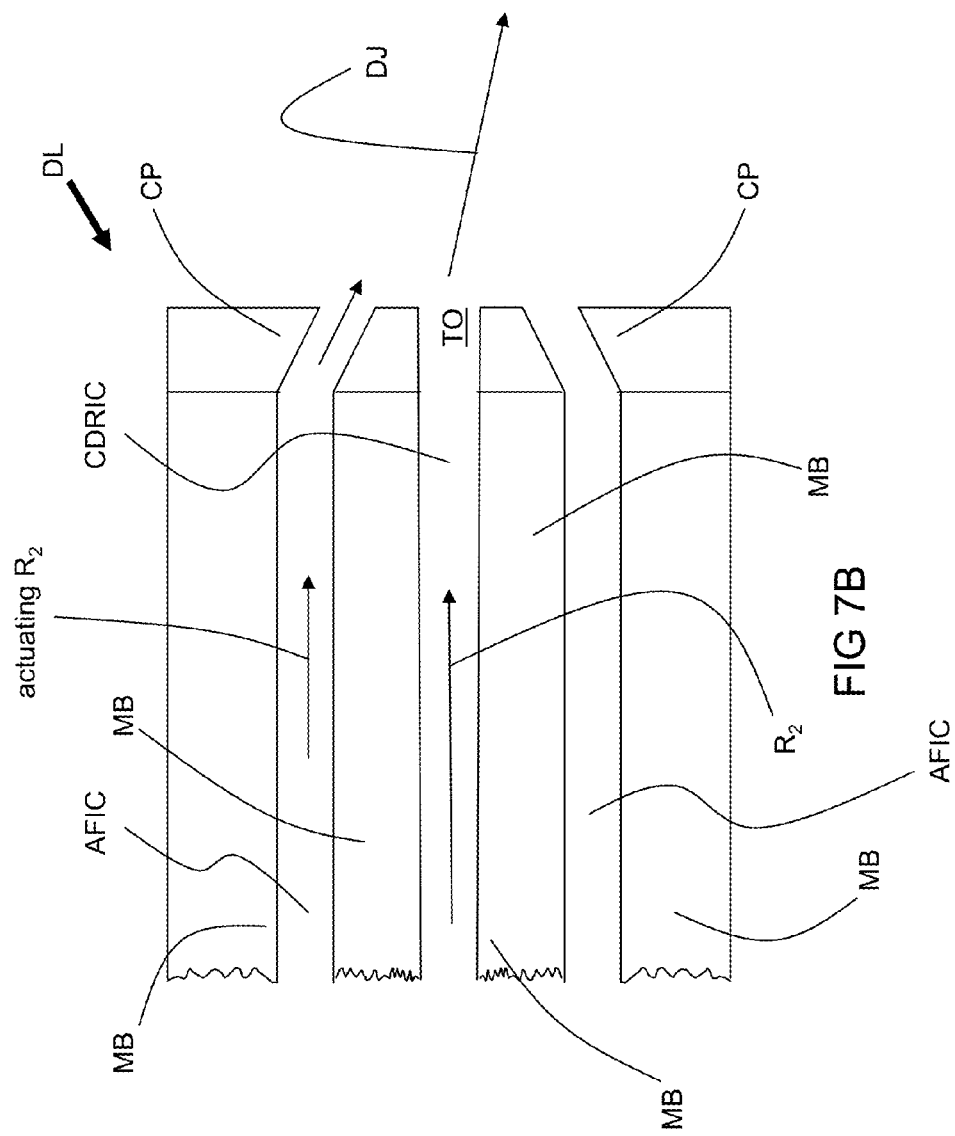
FIG. 7B is a schematic elevation view of a lengthwise slice taken of the dynamical lance of FIG. 7A.

Another type of dynamical lance DL suitable for use in the inventive methods and burners is shown in FIGS. 7A-7B. The dynamical lance DL includes a main nozzle body MB and a cap CP. A centrally disposed reactant injection channel CDRIC and two actuating fluid injection channels AFIC extend through the main nozzle body MB. A cap CP covers the end of the main nozzle body MB that faces the combustion chamber. Reactant $R_2$ flows through and is injected from a centrally disposed reactant injection channel CDRIC extending through the main body. When the dynamical lance DL is being used to divert a jet of reactant injected therefrom, reactant $R_2$ also flows through four actuating fluid injection channels AFIC. The actuating fluid injection channels AFIC are equally spaced at a same radial distance from the centrally disposed reactant injection channel CDRIC and extend through the main nozzle body MB. Optionally, there may be as many as three to eight actuating fluid injection channels AFIC in the main nozzle body MB each in fluid communication with a corresponding hole H. In any case, the actuating fluid injection channels AFIC are typically equally radially spaced around the centrally disposed reactant injection channel CDRIC.

The terminus (facing the combustion chamber) of the main nozzle body MB is covered with and joined to a cap CP. The cap CP has a terminal opening TO oriented along the axis of the centrally disposed reactant injection channel CDRIC. The terminal opening TO is generally sized to match a diameter of the centrally disposed reactant injection channel CDRIC so that the flow of reactant $R_2$ therethrough continues through the terminal opening and out the dynamical lance DL. The cap CP also includes two holes H drilled therethrough each one of which is in fluid communication between an outlet of a respective actuating fluid injection channel AFIC and the terminal face of the cap CP spaced away from the terminal opening TO. The holes H are drilled at an angle towards the axis of the centrally disposed reactant injection channel CDRIC, but the hole H does not intersect the terminal opening TO of the cap. Thus, the reactant flows out the terminal end of the centrally disposed reactant injection channel in the form of a jet through the terminal opening TO while the actuating fluid flows from the outlet of the actuating fluid injection channels AFIC into the holes H and exits out the cap CP in the form of a jet at an angle to the jet of reactant. The jet of actuating fluid intersects the jet of reactant after the reactant has exited the dynamical lance DL. Because the jet of actuating fluid intersects the jet of the reactant, the jet of reactant is caused to be bent/diverted in a direction away from the jet of actuating fluid. The, the direction and angle of bending/diversion may be controlled by injecting actuating fluid through the appropriate actuating fluid injection channel AFIC at the appropriate velocity. For example, the divertable jet DJ of reactant may be bent/diverted downwardly by injecting actuating fluid through an actuating fluid injection channel AFIC positioned above the centrally disposed reactant injection channel CDRIC. If the jet DJ is to instead be bent to the right-hand side of the burner, the actuating fluid is instead injected from an actuating fluid injection channel AFIC located to the left of the centrally disposed reactant injection channel CDRIC.

One type of dynamical fuel-oxidant nozzle DFON suitable for use in the inventive methods and burners is shown in FIGS. 4A-4E. The dynamical fuel-oxidant nozzle DFON may employ a main nozzle body MB having a centrally disposed larger-diameter bore LDB extending therethrough. Concentrically disposed within the large-diameter bore LDB is a smaller-diameter tube SDT so as to create a centrally disposed reactant injection channel CDRIC surrounded by an annularly-shaped reactant injection channel ARIC. Hence, it forms a tube-in-tube type configuration where an annular flow of one type of reactant flows in an annular space between an inner surface of the main nozzle body MB and an outer surface of the tube SDT and a central flow of the other type of reactant flows through the centrally disposed reactant injection channel CDRIC.

The main nozzle body MB also includes four actuating fluid injection channels AFIC extending therethrough that are spaced apart from the annularly-shaped reactant injection channel ARIC. The main nozzle body MB may have as few as one-three or as many as eight actuating fluid injection channels AFIC. When more than one actuating fluid injection channel AFIC is employed, they are typically disposed equi-radially around the large diameter bore LDB. The terminus of the main nozzle body is covered with a cap CP. The cap CP has a terminal opening TO oriented along the axis of the tube SDT and bore LDB and generally sized to match the diameter of the bore LDB so that the flow of one reactant annularly shrouding the other reactant continues through the terminal opening TO of the cap CP. The cap includes a cavity on the side facing the terminus of the nozzle body MB. The cavity extends in the axial direction of the cap CP (upstream to downstream) to terminate at a flat surface lying in a plane perpendicular to the axis of the dynamical fuel-oxidant nozzle DFON.

With continuing reference to FIGS. 4A-4E, the first and second reactants flow out the terminal ends of the centrally disposed reaction injection channel CDRIC and annularly-shaped reaction injection channel ARIC and out the terminal opening TO in the cap CP. The cavity also extends in the radial direction outward far enough so that it fluidly communicates with the outlet of the actuating fluid injection channels AFIC. Thus, as the actuating fluid exits the actuating fluid injection channel AFIC, the flat surface of the cavity redirects the direction of the flow of actuating fluid so that it intersects the flow of the fuel and oxidant at about a right angle. Because the jet of actuating fluid intersects the jet of the first and second reactants, the jet of these reactants is caused to be bent/diverted in a direction away from the jet of actuating fluid. The direction and angle of bending/diversion may be controlled by injecting actuating fluid through the appropriate actuating fluid injection channel AFIC at the appropriate velocity. For example, the divertable jet DJ of reactants may be bent/diverted downwardly by injecting actuating fluid through an actuating fluid injection channel AFIC positioned above the centrally disposed reactant injection channel CDRIC. If the jet DJ is to instead be bent to the right-hand side of the burner, the actuating fluid is instead injected from an actuating fluid injection channel AFIC located to the left of the centrally disposed reactant injection channel CDRIC.

Figure 6A:
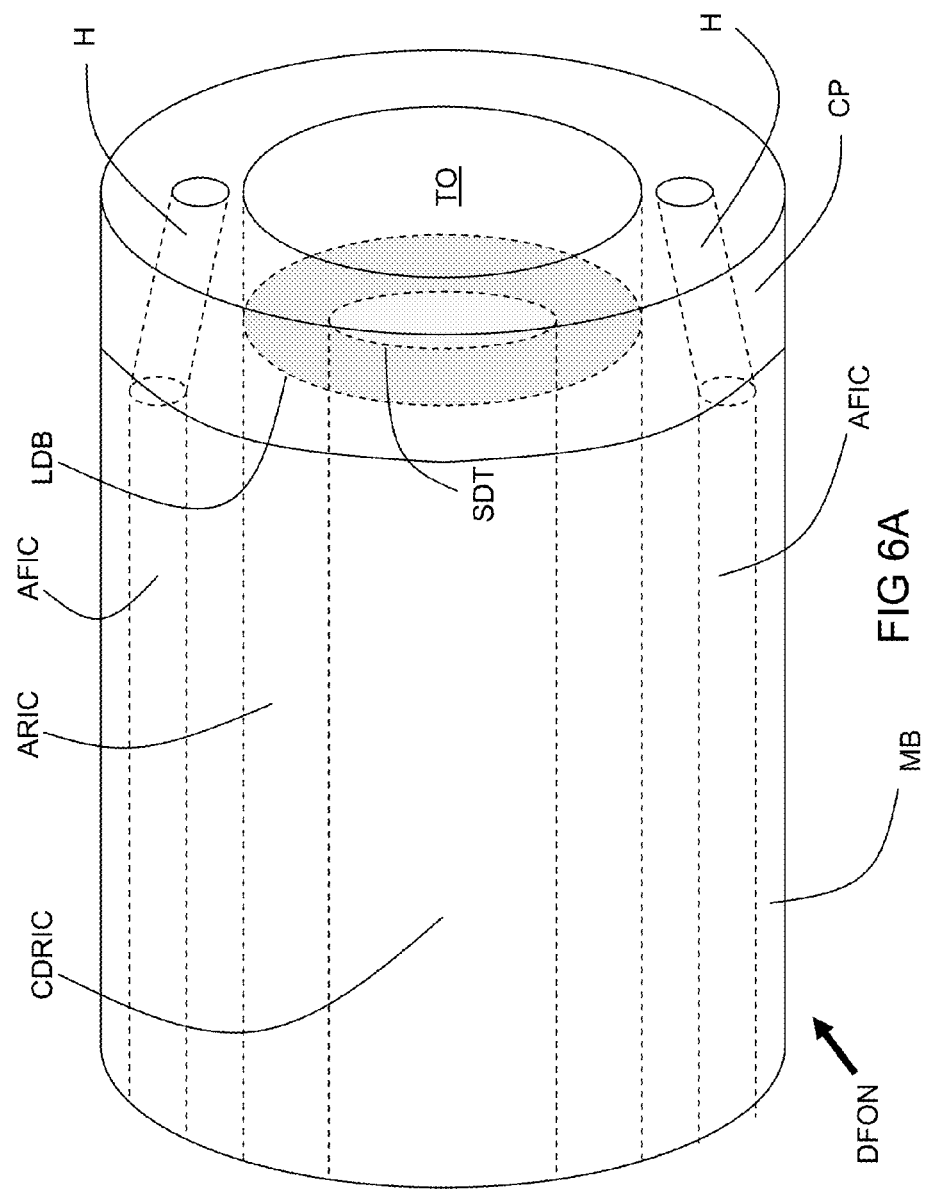
FIG. 6A is a schematic isometric view of a second embodiment of a fuel/oxidant nozzle of the disclosed burner.

Another type of dynamical fuel-oxidant nozzle DFON suitable for use in the inventive methods and burners is shown in FIGS. 6A-6B. The dynamical fuel-oxidant nozzle DFON includes a main nozzle body MB having a centrally disposed large-diameter bore LDB and a smaller-diameter tube SDT concentrically disposed within the large-diameter bore LDB. One of the reactants flows through a centrally disposed reactant injection channel CDRIC forming the interior of the smaller-diameter tube SDT while the other reactant flows through the annularly-shaped reaction injection channel ARIC in between an inner surface of the bore LDB and the outer surface of the tube SDT to annularly shroud that reactant at the outlet of the tube SDT and bore LDB.

The dynamical fuel-oxidant nozzle DFON also includes two actuating fluid injection channels AFIC extending therethrough main nozzle body MB. The terminus of the main nozzle body MB is covered with a cap CP. The cap CP has a terminal opening TO oriented along the axis of the bore LDB and tube SDT and generally sized to match a diameter of the bore LDB so that the flow of the fuel and oxidant through the centrally disposed reactant injection channel CDRIC/annularly-shaped actuating fluid injection channel AFIC continues through the terminal opening TO of the cap CP. The cap CP also includes two holes H drilled through it, a first end of which matches up with an outlet of a respective actuating fluid injection channel AFIC and a second end of which extends through the terminal end of the cap CP spaced away from the terminal opening TO of the cap CP.

The holes H are drilled at an acute angle towards the axis of the dynamical fuel-oxidant nozzle DFON, but the holes H do not intersect the terminal opening TO of the cap CP. Thus, the actuating fluid flows from the outlet of one of the actuating fluid injection channels AFIC into a respective hole H and exits out the cap CP in the form of a jet at an angle to the jet of the first and second reactants. The jet of actuating fluid intersects the jet of the first and second reactants after they exit the dynamical fuel-oxidant nozzle DFON. Because the jet of actuating fluid intersects the jet of the first and second reactants, the jet of the first and second reactants is caused to be bent/diverted in a direction away from the jet of actuating fluid. The direction and angle of bending/diversion may be controlled by injecting actuating fluid through the appropriate actuating fluid injection channel AFIC at the appropriate velocity. For example, the divertable jet DJ of reactants may be bent/diverted downwardly by injecting actuating fluid through an actuating fluid injection channel AFIC positioned above the centrally disposed reactant injection channel CDRIC. If the jet DJ is to instead be bent to the right-hand side of the burner, the actuating fluid is instead injected from an actuating fluid injection channel AFIC located to the left of the centrally disposed reactant injection channel CDRIC.

Example 1

A burner having the general design of FIG. 2C was built and tested where $R_1$ is natural gas, $R_2$ is oxygen. Natural gas was injected through a centrally disposed smaller-diameter tube while primary oxygen was injected through an annular space in between the centrally disposed smaller diameter tube and a larger diameter bore. It utilized an actuating jet of natural gas injected from an actuating fluid injection channel below the injection of natural gas and primary oxygen. The secondary lances injected the secondary oxygen. The numbers and types of lances/diameters are shown in Table IA. The burner was designed with the velocities of the various reactant injections shown in Table IIB in mind for operation at 1 MW.

TABLE IA

Example 1 burner design characteristics

|  | Lance | Dimensions (mm) | Area Each (m$^2$) |
| --- | --- | --- | --- |
| main fuel | 1 | diameter: 17 | 2.27 × 10$^{-4}$ |
| actuator fuel | 1 | 14.825 mm × 8 mm | 1.19 × 10$^{-4}$ |
| primary oxidant | 1 | outer diameter: 35.08 | 6.10 × 10$^{-4}$ |
| secondary oxidant | 2 | diameter: 17 | 2.27 × 10$^{-4}$ |

TABLE IB

Example 1 burner reactant velocities for operation at 1 MW power

|  | Velocity at full flow (m/s) | Velocity at full flow during startup (m/s) |
| --- | --- | --- |
| main fuel | 122.38 | 122.38 |
| actuator fuel | 93.69 | 0 |
| primary oxidant | 0 | 91.05 |
| secondary oxidant | 122.38 | 0 |

Once the furnace temperature reached 850° C., 90% of the total $O_2$ flow was supplied through the secondary lances SL. No visible flame was detected. Hence, flameless combustion was achieved.

Example 2

A burner having the general design of FIG. 2C was built and tested where $R_1$ is natural gas, $R_2$ is oxygen. Natural gas was injected through a centrally disposed smaller-diameter tube while primary oxygen was injected through an annular space in between the centrally disposed smaller diameter tube and a larger diameter bore. It utilized an actuating jet of natural gas injected from an actuating fluid injection channel below the injection of natural gas and primary oxygen. The secondary lances injected the secondary oxygen. The numbers and types of lances/diameters are shown in Table IIA. The burner was designed with the velocities of the various reactant injections shown in Table IIB in mind for operation at 1 MW.

TABLE IIA

Example 2 burner design characteristics

|  | Lance | Diameter (mm) | Area Each (m²) |
| --- | --- | --- | --- |
| main fuel | 1 | diameter: 17 | $2.27 \times 10^{-4}$ |
| actuator fuel | 1 | 14.825 mm × 8 mm | $1.19 \times 10^{-4}$ |
| primary oxidant | 1 | outer diameter: 35.08 | $6.10 \times 10^{-4}$ |
| secondary oxidant | 2 | 15 | $1.77 \times 10^{-4}$ |

TABLE IIB

Example 2 burner reactant velocities for operation at 1 MW power

|  | Velocity at full flow (m/s) | Velocity at full flow during startup (m/s) |
| --- | --- | --- |
| main fuel | 122.38 | 122.38 |
| actuator fuel | 93.69 | 0 |
| primary oxidant | 0 | 91.05 |
| secondary oxidant | 122.38 | 0 |

Once the furnace temperature reached 850° C., 90% of the total $O_2$ flow was supplied through the secondary lances SL. No visible flame was detected. Hence, flameless combustion was achieved.

Example 3

A burner having the general design of FIG. 2C was built and tested where $R_1$ is natural gas, $R_2$ is oxygen. Natural gas was injected through a centrally disposed smaller-diameter tube while primary oxygen was injected through an annular space in between the centrally disposed smaller diameter tube and a larger diameter bore. It utilized an actuating jet of natural gas injected from an actuating fluid injection channel below the injection of natural gas and primary oxygen. The secondary lances injected the secondary oxygen. The numbers and types of lances/diameters are shown in Table IIIA. The burner was designed with the velocities of the various reactant injections shown in Table IIIB in mind for operation at 1 MW.

TABLE IIIA

Example 3 burner design characteristics

|  | Lance | Diameter (mm) | Area Each (m²) |
| --- | --- | --- | --- |
| main fuel | 1 | diameter: 17 | $2.27 \times 10^{-4}$ |
| actuator fuel | 1 | 14.825 mm × 8 mm | $1.19 \times 10^{-4}$ |
| primary oxidant | 1 | outer diameter: 35.08 | $6.10 \times 10^{-4}$ |
| secondary oxidant | 2 | 21 | $3.46 \times 10^{-4}$ |

TABLE IIIB

Example 3 burner reactant velocities for operation at 1 MW power

|  | Velocity at full flow (m/s) | Velocity at full flow during startup (m/s) |
| --- | --- | --- |
| main fuel | 122.38 | 122.38 |
| actuator fuel | 93.69 | 0 |
| primary oxidant | 0 | 91.05 |
| secondary oxidant | 122.38 | 0 |

Once the furnace temperature reached 850° C., 90% of the total $O_2$ flow was supplied through the secondary lances SL. No visible flame was detected. Hence, flameless combustion was achieved.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention.

What is claimed is:

1. A method of distributed combustion comprises the steps of:
   a first jet of combustion reactants comprising a primary portion of an oxidant and a primary portion of a fuel is injected from a fuel-oxidant nozzle into a combustion space, wherein either the primary portion of oxidant enshrouds the primary portion of fuel or the primary portion of fuel enshrouds the primary portion of oxidant;
   a second jet of a secondary portion of one of the combustion reactants is injected from at least one dynamical lance into the combustion space, the combustion reactant of the second jet being the same as the combustion reactant that is injected annularly around the other combustion reactant in the first jet;
   a third jet of actuating fluid is injected close to the second jet to cause the second jet to be bent towards the first jet, wherein:
   if the second jet is of oxidant, after injection of the second jet is initiated, the primary portion of oxidant is decreased, the secondary portion of oxidant is increased until a desired degree of staging of overall oxidant between the primary and secondary portions is achieved, and the desired degree of staging is achieved when the secondary portion of oxidant makes up 90-95% of a total amount of the overall oxidant injected; and if the second jet is of fuel, after injection of the second jet is initiated, the primary portion of the fuel is decreased, the secondary portion of the fuel is increased until a desired degree of staging of overall fuel between the primary and secondary portions is achieved, and the desired degree of staging is achieved when the secondary portion of fuel makes up 90-95% of a total amount of the overall fuel injected.

2. The method of claim 1, wherein the primary portion of oxidant annularly enshrouds the primary portion of fuel.

3. The method of claim 2, wherein the oxidant is oxygen.

4. The method of claim 3, wherein the fuel is natural gas.

5. The method of claim 3, wherein the fuel is fuel oil.

6. The method of claim 2, wherein the oxidant is air.

7. The method of claim 6, wherein the fuel is natural gas.

8. The method of claim 6, wherein the fuel is fuel oil.

9. The method of claim 1, wherein the second jet is bent from an initial injection axis to a bent injection axis and the initial and bent axes describe an angle θ of up to 40°.

10. The method of claim 9, wherein θ is up to 15°.

11. The method of claim 1, wherein flameless combustion is achieved at the desired degree of staging.

12. The method of claim 2, wherein:
the actuating fluid is the oxidant; and
the actuating fluid makes up 1-20% of the total flow of oxidant from the at least one dynamical lance.

13. The method of claim 1, wherein the primary portion of fuel annularly enshrouds the primary portion of oxidant.

14. The method of claim 13, wherein:
the actuating fluid is the fuel; and
the actuating fluid makes up 1-20% of the total flow of the fuel from the at least one dynamical lance.

15. The method of claim 1, wherein the at least one dynamical lance comprises first and second dynamical lances disposed at a same vertical distance from the fuel-oxidant nozzle and at a same horizontal distance from the fuel-oxidant nozzle and opposite sides thereof.

16. The method of claim 2, wherein:
the actuating fluid is the oxidant;
at a nominal burner power, a velocity of the third jet is 100 m/s;
at a nominal burner power, a velocity of the primary portion of the fuel is 100-200 m/s;
at a nominal burner power, a velocity of the primary portion of the oxidant is 75-150 m/s; and
at a nominal burner power, a velocity of the secondary portion of the oxidant is 75-200 m/s.

17. The method of claim 2, wherein:
said method is performed in a heating phase and a distributed combustion phase;
heat of the combustion of the fuel and oxidant is used to melting a charge during the heating phase;
once a desired temperature is reached in the combustion space, a transition from the heating phase to the distributed combustion phase is commenced;
during the transition, said step of injecting the third jet is initiated;
the primary portion of oxidant is decreased and the secondary portion of oxidant is increased during the transition; and
the transition ends when the desired degree of staging is achieved and the distributed combustion phase begins.

18. The method of claim 13, wherein:
said method is performed in a heating phase and a distributed combustion phase;
heat of the combustion of the fuel and oxidant is used to melting a charge during the heating phase;
once a desired temperature is reached in the combustion space, a transition from the heating phase to the distributed combustion phase is commenced;
during the transition, said step of injecting the third jet is initiated;
the primary portion of oxidant is decreased and the secondary portion of oxidant is increased during the transition; and
the transition ends when the desired degree of staging is achieved and the distributed combustion phase begins.

19. The method of claim 2, wherein the oxidant is oxygen and the fuel is natural gas.

\* \* \* \* \*